United States Patent
Moriguchi et al.

(10) Patent No.: US 6,576,369 B1
(45) Date of Patent: Jun. 10, 2003

(54) GRAPHITE POWDER SUITABLE FOR NEGATIVE ELECTRODE MATERIAL OF LITHIUM ION SECONDARY BATTERIES

(75) Inventors: Koji Moriguchi, Nishinomiya (JP); Mitsuharu Yonemura, Amagasaki (JP); Kazuhito Kamei, Hyogo (JP); Noriyuki Negi, Amagasaki (JP); Masaru Abe, Kobe (JP); Hideya Kaminaka, Nishinomiya (JP)

(73) Assignees: Sumitomo Metal Industries, Ltd., Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/138,561

(22) Filed: Aug. 24, 1998

Related U.S. Application Data

(63) Continuation of application No. PCT/JP97/04806, filed on Dec. 25, 1997.

(30) Foreign Application Priority Data

| Dec. 25, 1996 | (JP) | ............................................ 8-345780 |
| Mar. 7, 1997 | (JP) | ............................................ 9-053441 |

(51) Int. Cl.$^7$ ............................................. C01B 31/04
(52) U.S. Cl. .................................... 429/231.8; 423/448
(58) Field of Search .......................... 428/402; 423/448, 423/445 R; 264/345; 241/23; 429/231.8

(56) References Cited

U.S. PATENT DOCUMENTS

| 3,859,422 A | * | 1/1975 | Horne, Jr. et al. .......... 423/448 |
| 5,753,387 A | * | 5/1998 | Takami et al. .............. 423/448 |

FOREIGN PATENT DOCUMENTS

| JP | 57-208079 | 12/1982 |
| JP | 4-115458 | 4/1992 |
| JP | 5-234584 | 9/1993 |
| JP | 5-307958 | 11/1993 |
| JP | 6-187972 | 7/1994 |
| JP | 7-223809 | 8/1995 |
| JP | 7-282812 | 10/1995 |
| JP | 9-259886 | 10/1997 |

OTHER PUBLICATIONS

Murayama, Hideki, "A Novel Form of Vapor–Grown Carbon Fibers", Mitsubishi Kasai R & D Review, 6, (1), pp. 10–18 (1992), English translation submitted herewith.

* cited by examiner

*Primary Examiner*—Stuart L. Henderickson
(74) *Attorney, Agent, or Firm*—Burns, Doane, Swecker & Mathis, LLP

(57) ABSTRACT

A graphite powder has surface closed-end structures in which the graphite c-plane layers of the graphite layer crystal lattices have closed-ends on the surface of the graphite powder by linking the ends of one or more pairs of the c-plane layers, leaving interstices which are open on the surface of the graphite. The number of open interstices is at least 100 and at most 1500 per micrometer in a c-axis direction of the graphite. Preferably, the graphite powder has a specific surface area of 1.0 m$^2$/g or less. Such a graphite powder can be prepared either by graphitizing a carbon material, which has been pulverized at a high speed under well-controlled conditions before and/or after the carbonization, or by subjecting a carbon material, which has been pulverized under well-controlled conditions before and/or after the carbonization, to graphitization and then to oxidative heat treatment at a temperature of 600–800° C. and finally to heat treatment at a temperature of 800° C. or higher in an inert gas. The graphite powder can be used to produce negative electrodes of lithium ion secondary batteries having a high discharge capacity of at least 320 mAh/g and a high charge/discharge coulombic efficiency of at least 90%.

15 Claims, 8 Drawing Sheets

GRAPHITE POWDER SUITABLE FOR NEGATIVE ELECTRODE MATERIAL OF LITHIUM ION SECONDARY BATTERIES

This application is a continuation of PCT/JP97/04806 filed Dec. 5, 1997.

TECHNICAL FIELD

The present invention relates to a graphite powder having a novel microstructure, which is suitable for use as a carbon material for negative electrodes of lithium ion secondary batteries. More specifically, the present invention pertains to a graphite powder capable of producing negative electrodes for lithium ion secondary batteries having a high discharge capacity and an improved charge/discharge coulombic efficiency and to a process for the preparation of such a graphite powder. It is also concerned with a material for negative electrodes of lithium ion secondary batteries and a lithium ion secondary battery having a negative electrode formed from such a material.

BACKGROUND ART

Lithium secondary or storage batteries are a class of nonaqueous secondary batteries using lithium as an active material for a negative electrode, an oxide or chalcogenide (e.g., sulfide or selenide) of a transition metal as an active material for a positive electrode, and a solution of an inorganic or organic lithium salt dissolved in an aprotic organic solvent as an electrolyte.

Since lithium is a base metal having a very low electric potential, use of lithium as a negative electrode in a battery provides the battery with the ability to readily obtain a high potential therefrom. For this reason, lithium secondary batteries have recently attracted increasing attention as promising secondary batteries having a high electromotive force and a high energy density, and they are expected to find applications as distributed batteries or portable batteries in a wide variety of fields including electronic equipment, electric equipment, electric vehicles, and electric power storage. Lithium secondary batteries have already been put into practical use as compact batteries.

Initially, lithium metal in the form of foil was used to form a negative electrode by itself in lithium secondary batteries. In such cases, the discharging and charging reactions proceed with dissolution (ionization) and deposition of lithium. In the reaction of $Li^+ \rightarrow Li$ during charging cycles, however, the metallic lithium tends to deposit as acicular crystals on the negative electrode, and repeated discharging and charging cycles cause the formation of lithium dendrite (tree-like branching crystals) on that electrode. As the lithium dendrite grows, it may break through the separator of the battery, leading to an internal short circuit by direct contact of the dendrite with the positive electrode. Therefore, these batteries have a fatal drawback of a very short cycle life in a repeated discharging and charging cycle test.

In order to eliminate this problem in lithium secondary batteries having a negative electrode of lithium metal, it was proposed to use carbon materials (e.g., naturally-occurring graphite, artificial graphite, petroleum coke, carbonized resins, carbon fibers, pyrolyzed carbon, carbon black, and the like), which are capable of reversibly receiving and releasing lithium ions, to form a negative electrode of these batteries [see, e.g., Published Unexamined Japanese Patent Application No. 57-208079(1982)]. In such batteries, the material for the negative electrode may be comprised substantially entirely of the carbon material. Such a negative electrode can be manufactured by attaching the carbon material in powder form to a metal base serving as a current collector, normally with the aid of a suitable binder.

The electrode reactions of a lithium secondary battery having a negative electrode made of a carbon material have not been elucidated completely but may be considered to be as follows. While the battery is charged, electrons are delivered to the carbon material of the negative electrode, thereby causing the carbon material to be negatively charged. The electrolyte contains lithium ions, which are attracted toward the negatively charged carbon material of the negative electrode and are received therein by an electrochemical intercalation reaction. Conversely, during a discharging cycle, the lithium ions contained in the carbon material are removed (deintercalated) from the negative electrode to release them into the electrolyte solution. Thus, charge and discharge occur by receipt of lithium ions into the negative electrode material and release of them from the material. In view of this mechanism, this type of battery is generally called a lithium "ion" secondary battery. Lithium ion secondary batteries do not involve the deposition of metallic lithium on the negative electrode during electrode reactions, thereby avoiding the problem of deposition of lithium dendrite, which deteriorates the negative electrode significantly. Lithium secondary batteries which are commercially used at present are mostly of this type, i.e., of the type having a negative electrode of a carbon material.

The theoretical capacity of a lithium secondary battery having a negative electrode of lithium metal is very high, i.e., on the order of 3800 mAh/g. In the case of a lithium ion secondary battery having a negative electrode of a carbon material which receives lithium ions therein, its theoretical capacity is limited to 372 mAh/g even when the negative electrode is comprised of a lithium-graphite intercalation compound ($C_6Li$), which is a graphite (a highly crystalline carbon material) having lithium ions densely and regularly incorporated in the interstices between the layer crystal lattices of graphite.

In practice, however, the carbon material used as a negative electrode has surface active sites which interfere with entry of lithium ions and dead regions incapable of receiving lithium ions. Therefore, even if a highly crystalline graphite is used to form a negative electrode of a lithium ion secondary battery, it is extremely difficult to achieve a capacity of 372 mAh/g, the theoretical capacity of $C_6Li$.

In addition, when a highly crystalline carbon material or graphite is used to form a negative electrode, the surface of the electrode has a higher reactivity than the inside thereof since the crystal structure is interrupted on the surface, and a passivated film tends to deposit on the more reactive surface as a component of the electrolyte is slightly decomposed by the action of a high charge voltage. The quantity of electricity consumed for the decomposition is lost wastefully, thereby decreasing the charge/discharge coulombic efficiency (ampere-hour efficiency) of the electrode, i.e., the ratio of discharged to charged quantity of electricity, which is an indication of the performance of a secondary battery, calculated by the equation [(discharge capacity)/(charge capacity)×100 (%)]. The use of such a material requires that a battery be designed using an extra amount of material for the positive electrode to allow for the decrease in charge/discharge coulombic efficiency. This is disadvantageous for applications such as compact batteries which have a given shape defined by specifications.

In order to increase the discharge capacity of a carbon negative electrode for lithium ion secondary batteries to as close to the above-described theoretical capacity as possible, various methods have been proposed for the production of a carbon material for the negative electrode.

For example, Published Unexamined Japanese Patent Applications Nos. 4-115458 (1992), 5-234584 (1993), and 5-307958 (1993) disclose the use of a carbonized product of mesophase microbeads which are formed in the course of carbonization of pitch. The mesophase microbeads are liquid crystalline spherical particles exhibiting optical anisotropy and are formed by subjecting pitch to heat treatment for a few hours or more at about 400–550° C. When the heat treatment is further continued, the microbeads are grown and finally united with each other to form a mass, called a bulk mesophase, which exhibits optical anisotropy as a whole. The bulk mesophase may be used as a material for carbonization. However, the carbonized products of these materials, when used as a negative electrode, do not have a sufficiently high discharge capacity.

Published Unexamined Japanese Patent Application No. 7-282812 (1995) states that the capacity of a lithium ion secondary battery having a negative electrode made of graphitized carbon fibers can be enhanced by increasing the regularity of the aligned layer structure of graphite crystal lattices in the negative electrode. It is pointed out therein that pulverization of the carbon fibers introduces undesirable structural defects which disturb the regularity of the aligned layer structure of the graphitized carbon fibers. The increased regularity of the aligned layer structure of graphite crystal lattices provides the negative electrode with a discharge capacity of at most 316 mAh/g, but cannot produce a carbon material for a negative electrode having a sufficiently high capacity, e.g., one exceeding 320 mAh/g.

Published Unexamined Japanese Patent Application No. 6-187972(1994) discloses a carbon material produced by calcination at a high temperature for carbonization of a particular resin formed by reacting an aromatic reactant with a crosslinking agent in the presence of an acid. The resulting carbon material has a microstructure comprising crystalline phases formed by crystallization of the aromatic reactant, which are intermingled with amorphous phases derived from the crosslinking agent. These two types of phases have different indices of thermal expansion and shrinkage, which causes the carbon material to have numerous internal structural defects in the form of voids. It is described in this application that the carbon material gives a high capacity when used to form a negative electrode of a lithium ion secondary battery, since absorption of lithium metal by the voids also occurs, in addition to interlayer absorption of lithium ions due to the above-described intercalation (formation of $C_6Li$). This carbon material is disadvantageous from a cost standpoint since its material costs are high due to the use of a special resin for carbonization. Furthermore, it cannot provide the negative electrode with improved charge/discharge coulombic efficiency.

DISCLOSURE OF INVENTION

It is an object of the present invention to fabricate a lithium ion secondary battery having a high discharge capacity and preferably an improved charge/discharge coulombic efficiency, using a carbon material which can be produced from a conventional inexpensive raw material rather than from a special resin.

A more specific object of the present invention is to provide a graphite powder capable of receiving an increased amount of lithium ions therein, which, when used as a material for the negative electrode of a lithium ion secondary battery, can achieve a high discharge capacity on the order of at least 315 mAh/g, preferably at least 320 mAh/g, more preferably at least 330 mAh/g, and under some conditions, 350 mAh/g or more, in a stable manner.

The inventors of the present invention systematically investigated the relationship between the microscopic structure of a graphite powder and its charge/discharge characteristics and analyzed it in various ways using theoretical calculations. As a result, it has been found that the surface of a graphite powder has "closed-end structures" formed by closing pairs of c-plane layers of the graphite layer lattices at their ends during heat treatment for graphitization. As schematically shown in FIG. 1, the closed-end structures on the surface of the graphite powder (surface closed-end structures) are in a laminar form constituted by several pairs of c-plane layers which are closed at their ends around adjoining layers. Between two adjacent laminar closed-end structures, there remains an "interstice" which is open at the end of the c-plane layers.

It has also been found that the density of the open interstices (which corresponds to the density of the laminar closed-end structures) significantly influences the discharge capacity of a lithium ion secondary battery having a negative electrode formed of the graphite powder. Namely, the discharge capacity can be improved by increasing the density of the open interstices, thereby making it possible to achieve the above-described desired values for discharge capacities. In addition, it has been noted that the density of the open interstices can be increased by the conditions for pulverization of a carbon material prior to graphitization or by heat treatment after graphitization.

The present invention provides a graphite powder characterized by having surface closed-end structures in which the graphite c-plane layers have closed-ends on the surface of the graphite powder formed by linking the ends of pairs of c-plane layers while leaving interstices which are open on the surface of the graphite, the number of the open interstices being at least 100 and at most 1500 per micrometer measured in a c-axis direction of the graphite. Preferably, the graphite powder has a specific surface area of 1.0 $m^2/g$ or less.

The graphite powder according to the present invention can by prepared by a process comprising subjecting a carbon material, which has been carbonized and pulverized at a high speed before and/or after the carbonization, to heat treatment at a temperature of 2500° C. or higher for graphitization.

Alternatively, the graphite powder can also be prepared by a process comprising subjecting a graphite powder to heat treatment under conditions that can remove the surface of the graphite and subsequently to additional heat treatment at a temperature of 800° C. or higher in an inert gas. The graphite powder used in this process as a starting material (to be subjected to the heat treatments) may be a powder of either artificial or natural graphite. The artificial graphite powder may be prepared by subjecting a carbon material, which has been carbonized, to heat treatment at a temperature of 2500° C. or higher for graphitization and performing pulverization before or after the carbonization or after the graphitization. The natural graphite powder may be prepared merely by pulverizing naturally-occurring graphite. This second process can prepare a graphite powder according to the present invention which has a significantly increased density of open interstices, i.e., a very large number of open interstices per micrometer. The heat treatment under conditions that can remove the surface of the graphite is preferably oxidative heat treatment.

The present invention also provides a material for negative electrodes of lithium ion secondary batteries, comprising predominantly the graphite powder according to the present invention, and a lithium ion secondary battery having a negative electrode produced using such material.

DETAILED DESCRIPTION OF THE INVENTION

A graphite powder according to the present invention has "closed-end structures" of c-plane layers of the graphite layer lattices on the surface of the graphite powder (which are referred to as "surface closed-end structures"). The surface closed-end structures are formed by linking the end of each c-plane layer of the graphite layer lattices (which ideally is a carbon hexagonal network layer consisting of six-membered carbon rings fused to one another in a plane) to the end of another neighboring c-plane layer to make a pair forming a closed-end on the surface of the graphite powder. The formation of such closed-end structures on the surface of a graphite powder is considered to occur because closed-end structures in which pairs of c-plane layers of the graphite layer lattices are closed by linking the ends thereof are more stable in energy level than open-end structures in which each c-plane layer has a free and interrupted end on the surface of the graphite powder.

Figure 1:
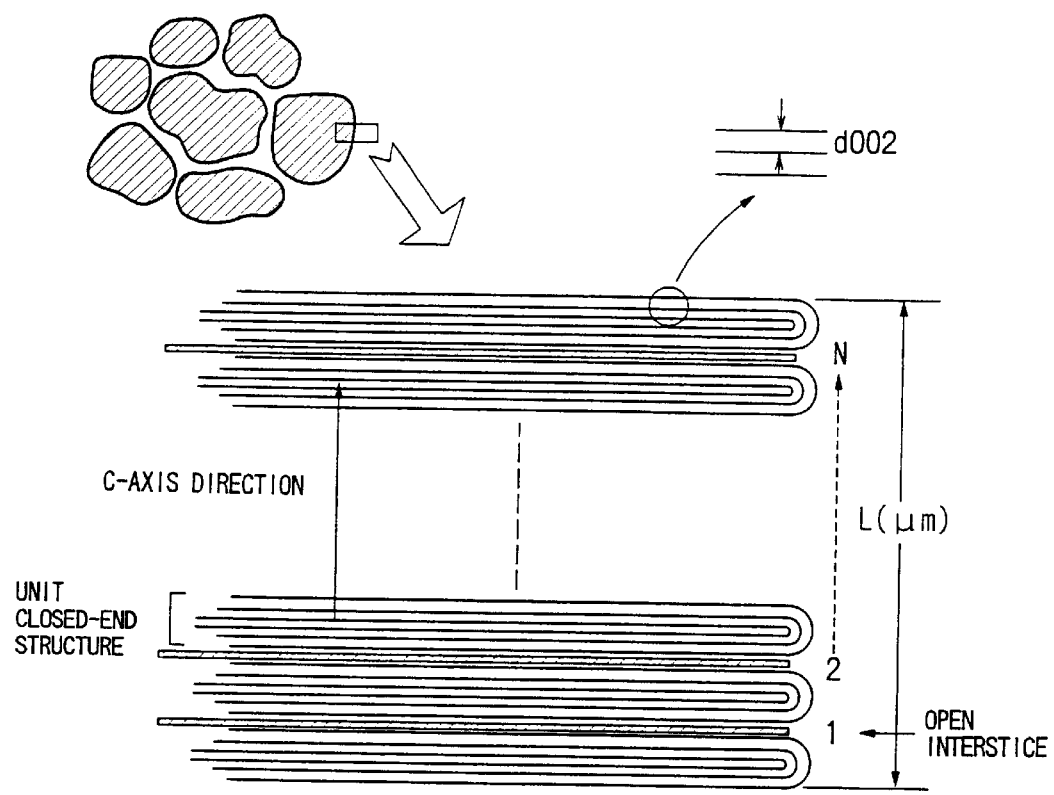
FIG. 1 is a schematic diagram showing c-plane layers of graphite layer lattices which have closed-end structures appearing on the surface of a graphite powder according to the present invention.

As shown in FIG. 1, the closed-end structures are generally in the form of layered or laminar closed-end structures which are formed by closing the ends of a plurality of pairs of c-plane layers coaxially, rather than single-layer closed-end structures each formed by closing the ends of a single pair of c-plane layers. Each laminar closed-end structure having a plurality of coaxial closed-end layers is herein referred to as a "unit closed-end structure". The space between adjacent two "unit closed-end structures" is open at the end of the c-plane layers on the surface of the graphite powder, and this space is herein referred to as an "open interstice". For simplicity, only three-layered closed-end structures constituted by six c-plane layers are shown in the Figure, but the number of closed-end layers constituting each unit closed-end structure normally varies from one unit structure to another, and may be as large as ten or more.

Figure 2:
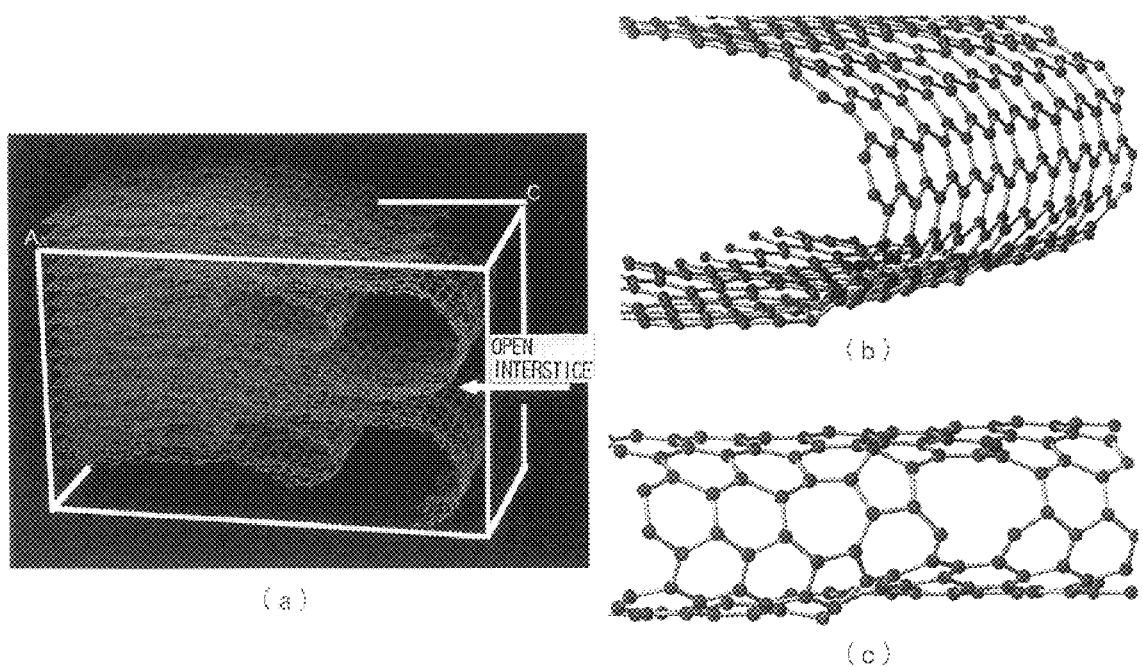
FIGS. 2(*a*), 2(*b*)), and 2(*c*) are illustrations created by a computer simulation technique to demonstrate the formation of surface closed-end structures of c-plane layers of graphite layer lattices, in which FIG. 2(*a*) shows open interstices in the closed-end structures, FIG. 2(*b*)) is a perspective view showing a closed-end structure with defect-free lattices, and FIG. 2(*c*) is an end view of a closed-end structure.

The occurrence of such laminar closed-end structures on the surface of a graphite powder was confirmed by analyzing the influence of heat treatment conditions for graphitization of a carbon material by a computer simulation technique called the molecular dynamics method. FIGS. 2(*a*) to 2(*c*) show examples of computer graphics obtained by computer simulation, which demonstrate that a pair of c-plane or carbon network layers are closed by linking the ends of these layers. For ease of illustration, a closed-end structure comprising only one pair of layers is shown in FIGS. 2(*b*)) and 2(*c*).

Figure 3:
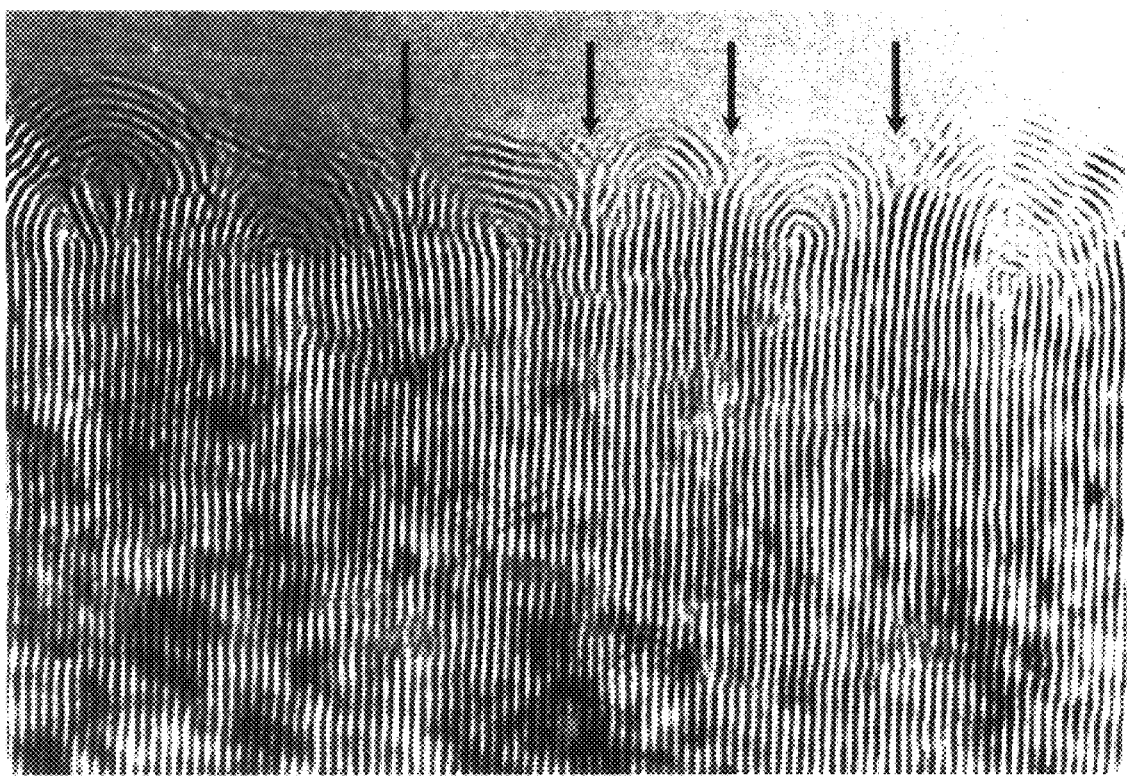
FIG. 3 is a high-resolution electron photomicrograph showing closed-end structures observed on the surface of a graphite powder.

These closed-end structures can actually be observed in a high-resolution transmission electron photomicrograph of a cross section of a graphite powder formed by cutting the graphite powder in a c-axis direction (perpendicular to the c-planes, as shown in FIG. 1). An example of such an electron photomicrograph is shown in FIG. 3, which illustrates the surface closed-end structures of a graphite powder obtained by heat treatment of a pulverized carbon material at 3000° C. for graphitization. The thin white regions in the figure are c-plane layers of graphite layer lattices, and open interstices between two adjacent unit closed-end structures are indicated by arrows.

Graphite obtained by heat treatment of a carbon material has layer crystal lattices of c-plane layers (carbon network layers). Each c-plane layer ideally consists of six-membered carbon rings fused regularly to one another in a plane, as shown in FIG. 2(*b*)). In fact, however, many irregular, defective carbon rings, including five-membered rings, as well as seven-or larger-membered rings making holes, are found, particularly at the closed-end regions, where an increased stress is applied due to the deformation required for closure.

Upon investigation by a molecular orbital method to determine the location of the region in the closed-end structures of graphite layer lattices where lithium ions are most likely to pass through, the location was found to be the interstices between two adjacent unit closed-end structures, i.e., the open interstices [see FIG. 2(*a*)]. At the open ends of these interstices, interaction between carbon atoms and lithium ions occurs weakly, decreasing the barrier energy for entry of lithium ions and allowing a large number of lithium ions to easily pass therethrough.

The ease of entry of lithium ions into a carbon material as a negative electrode increases as the number of entry sites of lithium ions in the carbon material increases. Thus, as the density (number per unit length) of open interstices (acting as entry sites) at the end of c-plane layers of graphite layer lattices increases, lithium ions more easily enter the negative electrode, thereby increasing the amount of lithium ions received by the electrode and hence improving the discharge capacity. The graphite powder according to the present invention has a sufficiently high density of open interstices in the closed-end structures of graphite c-plane layers to achieve a significant improvement in discharge capacity.

In general, a graphite powder consists of a number of regions having different c-axis directions (these regions corresponding to crystal grains of a polycrystalline powder). Each such region (an area having the same c-axis direction) is called crystallite. In a graphite powder according to the present invention, it is not necessary for all the crystallites constituting the powder to have the above-described surface closed-end structures of c-plane layers, but it is preferred that substantially all the crystallites have such surface closed-end structures.

The density of open interstices indicates the number of open interstices per micrometer measured in a c-axis direction of the graphite layer lattices. The density can be determined from an electron photomicrograph as shown in FIG. 3 by measuring a length, L in micrometers, of a certain field of the photomicrograph containing the surface of the graphite, and counting the total number, N, of open interstices observed in the measured field, the ratio N/L being the density (see FIG. 1). For example, these measurements may be performed on a number of fields (e.g., ten fields), and the average of the values determined in this manner may be recorded as the density.

Figure 4:
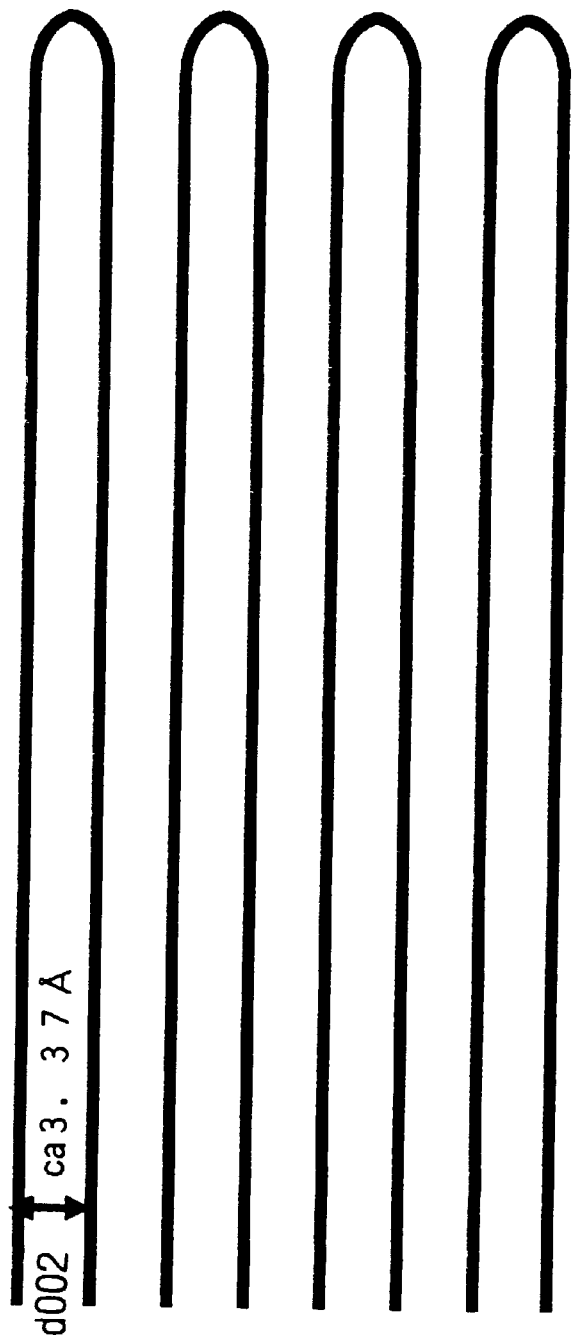
FIG. 4 is a schematic diagram showing the case where the surface closed-end structures have the highest density of open interstices.

The graphite powder according to the present invention has surface closed-end structures of graphite c-plane layers in which the number (density) of open interstices is in the range of from 100 to 1500 per micrometer. If this number is less than 100 per micrometer, then the amount of lithium ions to be received by the graphite will be decreased due to a decreased number of open interstices serving as entry sites for lithium ions. As a result, it may be impossible to attain a high discharge capacity on the order of 320 mAh/g or higher. The highest number, i.e., 1500 open interstices per micrometer, corresponds to the number obtained in the case where each unit closed-end structure is formed from a single pair of adjacent c-plane layers which are closed to form a single layer end, as depicted in FIG. 4. This is the maximum number of open interstices theoretically expected from the layer crystal structure of graphite.

If the ends of c-plane layers of graphite appearing on the surface thereof are open (free) without forming closed-end structures, not only lithium ions but also the electrolyte solution may enter the graphite. Since these open ends are less stable chemically, the electrolyte solution may evolve a gas due to decomposition of a certain component of the solution, thereby causing detachment of the graphite from the current collector on which the graphite is supported. Thus, the surface closed-end structures of a graphite powder leads to an improved cycle life of lithium ion secondary batteries which are to be subjected to repeated charging and discharging cycles.

Furthermore, the surface closed-end structures of c-plane layers allow all the carbon six-membered rings existing at the end of each c-plane layer to bond to each other, and thus there exist no vacant $sp^2$ hybrid electron orbitals of carbon atoms. This state is less reactive than the state in which the end of each c-plane layer is open. In view of the fact that the charge/discharge coulombic efficiency of a lithium ion secondary battery is adversely affected by any reaction of the graphite powder in the negative electrode with the electrolyte solution, the closed-end structures are beneficial to improvement in charge/discharge coulombic efficiency.

However, even if a graphite has such closed-end structures, there may exist some carbon atoms remaining unbound to give open-end structures, which are more reactive and which may decrease the charge/discharge coulombic efficiency due to a reaction with the electrolyte solution. In order to further improve the charge/discharge coulombic efficiency, it is advantageous to decrease the specific surface area of the graphite powder to further decrease its reactivity with the electrolyte solution. For this reason, it is preferable that the graphite powder according to the present invention have a specific surface area of 1.0 $m^2/g$ or less. The surface area can be determined by a conventional $N_2$ adsorption method using the BET adsorption isotherm equation.

If the graphite powder has a specific surface area greater than 1.0 $m^2/g$, it has an increased reactivity with the electrolyte solution, which may cause the charge/discharge coulombic efficiency and cycle life to deteriorate. The minimum specific surface area is not critical, but it is usually 0.5 $m^2/g$. More preferably, the specific surface area is between 0.2 and 0.8 $m^2/g$. The specific surface area of the graphite varies primarily with conditions for pulverizing, particularly the duration of pulverizing.

It is also preferable that the graphite powder according to the present invention have the following properties:

(1) the (002) plane-lattice spacing in a c-axis direction (d002) is 3.3700 Å or less as determined by a refined lattice constant measuring method using X-ray diffractometry;

(2) the graphite crystallite size in a c-axis direction is in the range of 100 to 2000 Å; and (3) the volume cumulative mean particle diameter is in the range of 5 to 35 $\mu$m as determined by a laser diffraction/scattering method.

The c-axis direction of a graphite crystal is perpendicular to the c-planes of the graphite layer lattice structure, as shown in FIG. 1. The (002) plane-lattice spacing (d002) is the distance between adjacent c-plane layers, marked as "d002" in FIG. 1. The lattice spacing d002 of graphite is an index of its degree of crystallinity. Thus, as the value for d002 decreases to reach that for an ideal graphite crystal(= 3.354 Å), the graphite has a higher crystallinity. The crystallinity of graphite depends on the heat treatment conditions for graphitization to which the graphite has been subjected. Thus, as the temperature and duration of heat treatment increase, the resulting graphite tends to have a higher crystallinity.

The lattice spacing values of a crystal can be determined by diffraction peaks on an X-ray diffraction pattern. The method conventionally employed in Japan to determine the lattice spacing of graphite was "the method for measurement of lattice constant and crystallite size of artificial graphite" (commonly named "Gakushin-ho") prescribed by the 117th Committee of the Japan Society for the Promotion of Science. According to this method, however, there is a possibility that the determined value may not be correct due to relatively large errors involved in the method. Therefore, in the context of the present invention, a more precise value for d002 determined from an X-ray diffraction pattern by a refined lattice constant measuring method in which the least square method is applied even to possible errors of the diffractometer used is employed. When the value for d002 is larger than 3.3700 Å, the crystallinity of the graphite powder may not be sufficient to achieve a high discharge capacity. The value for d002 is more preferably 3.3650 Å or less.

The crystallite size of graphite is the length measured in a c-axis direction of a graphite crystallite as described above.

If the crystallite size is less than 100 Å, the crystallite is so small as to introduce a significant disturbance into the crystal lattices, and it does not allow lithium ions entering through the open interstices to be efficiently received therein. On the other hand, in order to achieve a crystallite size exceeding 2000 Å, a prolonged heat treatment is required for graphitization, which is disadvantageous from an economic viewpoint. The crystallite size is more preferably in the range of 500 to 1500 Å.

The mean particle diameter of a graphite powder in the context of the present invention is the value at 50% cumulation of a volume cumulative distribution curve of particle diameter measured by a laser diffraction/scattering method. If the mean particle diameter is smaller than 5 μm, the graphite powder is so fine that its specific surface area is very large, thereby causing a decrease in charge/discharge coulombic efficiency. With a mean particle diameter larger than 35 μm, it may take a prolonged time for lithium ions which have penetrated deeply within the graphite powder to diffuse toward the surface of the powder, thereby interfering with the discharge properties, particularly under high-current or low-temperature discharge conditions. The mean particle diameter of the graphite powder according to the present invention is more preferably from 10 to 30 μm.

It is also preferable that the graphite powder does not contain substantially any coarse particles larger than 75 μm which adversely affect discharge properties under high-current or low-temperature discharge conditions, nor any fine particles smaller than 1 μm which interfere with the initial charge/discharge properties. In addition, when a graphite powder incorporating coarse particles as above is applied to an electrode plate in strip form as a support and the plate is rolled with a large number of turns to form a roll-type electrode plate and inserted into an appropriate battery container, a concentrated stress is imposed on the coarse particles. As a result, the problem might arise of these particles penetrating through the adjacent thin separator membrane which typically has a thickness of about 20 μm, thereby creating an internal short circuit between the negative and positive electrodes. This problem is more likely to occur with graphite powders of irregular shapes having significantly different dimensions of their longer and shorter diameters. It is difficult to remove these irregularly-shaped particles by sieving. If the mean particle diameter of the graphite powder is larger than 35 μm, then the probability of incorporation of irregularly-shaped particles would be increased.

The graphite powder according to the present invention can be prepared by subjecting a carbon material, which has been carbonized and pulverized, to heat treatment at a suitable temperature for graphitization. The graphitization procedure alone can produce a graphite powder which meets the requirement according to the present invention that the number of open interstices of the closed-end c-plane layers be at least 100 per micrometer in a c-axis direction, as long as the pulverization is performed at a high speed. This preparation process is hereunder referred to as a first process. By the first process, however, if the comminution equipment (hereinafter referred to as a pulverizer) used is a conventional one, the number (density) of open interstices is typically slightly larger than 100 per micrometer (e.g., from 100 to 120 per micrometer), and it is normally impossible to attain a very high number, e.g., in excess of 200, of open interstices per micrometer.

In a second process according to the present invention, a graphite powder, which may be either a powder of artificial graphite which has been heat treated as above or a powder of natural graphite which has been pulverized, is subjected to heat treatment under conditions that can remove the surface of the graphite (e.g., oxidative heat treatment at a temperature of 600–800° C.) and subsequently to additional heat treatment at a temperature of 800° C. or higher in an inert gas. This process makes it possible to achieve a very large number of open interstices, e.g., on the order of 500 to 1500 per micrometer.

The processes for preparing a graphite powder according to the present invention are not limited to the above-described first and second processes. Any process can be employed to produce a graphite powder according to the present invention as long as it can finally result in the formation of a graphite powder having surface closed-end structures of c-plane layers in which the number of open interstices is at least 100 per micrometer measured in a c-axis direction.

The raw carbonaceous material to be used for carbonization is not critical and may be any material which has conventionally been used in the production of graphite powder. Examples of such raw carbonaceous materials include coal tar pitches and petroleum pitches, mesophase microbeads formed by heat treatment of these pitches, and bulk mesophase which is a matrix of mesophase microbeads, as well as various organic resins and organic substances (e.g., polyacrylonitriles and rayons) including the resin disclosed in Published Unexamined Japanese Patent Application No. 6-187972(1994). Particularly preferred raw carbonaceous materials are mesophase microbeads and bulk mesophase.

The raw carbonaceous material may be pulverized or otherwise comminuted and carbonized to form a carbon material in the form of a powder. The pulverization or comminution may be performed before and/or after the carbonization step. Pulverization is preferably conducted before carbonization to make it possible to perform carbonization and graphitization by consecutive heat treatment procedures to save energy costs. The pulverization creates minute depressions at the atomic level (layer defects) on the surface of the resulting powder, which cause the formation of the above-described closed-end structures during subsequent heat treatment for graphitization. Therefore, particularly in the first process, it is essential to perform pulverization prior to heat treatment for graphitization in order to produce a graphite powder having the desired surface closed-end structures with a high density of open interstices, and the conditions under which the pulverization is performed have a significant effect on the density of open interstices in the closed-end structures of the graphite powder formed by subsequent heat treatment.

If the pulverization is performed subsequent to the graphitization step, it may bring about the formation of defects in the c-plane layers of the graphite powder formed by graphitization and destroy the surface closed-end structures introduced by graphitization. Therefore, in the first process, it is not desirable to perform any pulverization on the graphite product. Thus, in the first process, prior to final heat treatment for graphitization, pulverization should be performed so as to obtain a particle size desired for the final graphite product (preferably a mean particle diameter between 5 and 35 μm as described previously). However, low-force crushing intended for disintegration, and classification or screening to remove fines or adjust the mean particle diameter may be conducted after graphitization.

Pulverization (which includes any comminution procedure) also has a significant effect on the specific surface area of the finally produced graphite powder. As the speed of the pulverizer used and the duration of pulverization increase, the specific surface area tends to increase. The type of comminution equipment influences the crystallite size of the graphite product. Thus, the type of pulverizer and conditions for pulverization should be selected by taking their effects on the specific surface area and crystallite size of graphite into consideration.

In general, heat treatment for carbonization of a raw carbonaceous material (e.g., a mesophase material) is accompanied by a significant reduction in specific surface area due to gas evolution from the raw material and fusion by the generated oils. In the subsequent heat treatment for graphitization, an additional slight reduction in specific surface area occurs by melting and re-linking. When it is desired to prepare a graphite powder having a specific surface area of 1.0 $m^2/g$ or less according to a preferred embodiment of the present invention, pulverization should be performed by allowing for the above-described change of specific surface area during heat treatment. By way of illustration, when a mesophase material is pulverized prior to carbonization, pulverization may be performed in such a manner that the pulverized material has a specific surface area of 5 $m^2/g$ or less. When pulverization is performed on a carbon material which has been carbonized, the pulverized material may have a specific surface area of 1.1 to 1.2 $m^2/g$ or less. These are mere illustrative values, and the conditions for pulverizing may be determined by experiment so as to produce a graphite powder having a specific surface area of 1.0 $m^2/g$ or less after the graphitization step.

The pulverization may be performed by use of a conventional pulverizer (pulverizer, mill, etc.) including, for example, a hammer mill, fine mill, attrition mill, and ball mill. Preferably, the pulverizer is of the impact grinding type, an example of which is a hammer mill. As described previously, the microstructures of the graphite crystals are largely influenced by the conditions for pulverizing, particularly in the first process, and pulverization should be performed at a high speed in order to produce a graphite powder having 100 or more open interstices per micrometer in the closed-end structures by that process. The particular conditions for pulverizing (e.g., pulverizing speed in terms of number of revolutions in the case of a rotary type pulverizer, and duration of pulverization) to achieve that end vary with the type of pulverizer and the raw carbonaceous material used and can be determined by experiment such that the resulting graphite powder has 100 or more open interstices per micrometer in the closed-end structures and a desired mean particle diameter.

For example, in the case of pulverization in a hammer mill or attrition mill, a rotational speed of 5000 rpm or higher of the mill is sufficient in most cases to produce, by the first process, a graphite powder having 100 or more open interstices per micrometer in the closed-end structures. The number of open interstices may not often reach 100 per micrometer with a lower rotational speed. The highest rotational speed which can be practically achieved will usually be 15000 rpm. In a conventional procedure, pulverization may be continued for a prolonged period on the order of 30 minutes. In order to produce a graphite powder having a relatively small specific surface area, it is advantageous that the rotational speed not be increased too high and that the duration of pulverization be relatively short. Preferred conditions for pulverizing by a hammer mill are up to 15 to 30 minutes at speed of 5000–7500 rpm.

Such high speed pulverizing may also be employed in the second process, thereby making it possible to produce a graphite powder having open interstices in the closed-end structures with an extremely high density, e.g., on the order of 500 or more open interstices per micrometer. In the second process, however, since the density of open interstices can be greatly increased by the heat treatment procedures performed subsequent to graphitization, it is not necessary to perform the pulverization at a high speed. Thus, pulverization may be conducted at a rotational speed of 4000 to 5000 rpm, for example. Alternatively, it is possible to use a shearing-type pulverizer such as a disc crusher to perform the pulverization procedure at a rotational speed as low as several tens to several hundreds of revolutions per minute. In the second process, the freedom of selection of pulverizer and pulverization speed is large, and thus it is easier to control the conditions for pulverization so as to produce a graphite powder having a specific surface area of 1.0 $m^2/g$ or less.

An alternative technique of pulverization which can be employed is the use of a disc crusher combined with a hammer mill in the first process or the use of a disc crusher alone in the second process. In this case, the hammer mill used in the first process should be operated at a high speed (i.e., 5000 rpm or higher) as described above. The disc crusher performs its comminution function primarily by cleavage of a layer-lattice material caused by application of a shearing force thereto. Therefore, in order to make such comminution process easier, it is preferable that a disc crusher be applied to a carbon material after the carbonization step is finished. Use of a disc crusher is advantageous in that it is easy to control the crystallite size, particularly to a relatively large size, and in that the pulverized powder has a relatively uniform particle size.

By using the just-mentioned technique, it is possible to produce a graphite powder having 1000 or more open interstices per micrometer, i.e., at an extremely low pitch or high density, in the closed-end structures even by the first process (i.e., by use of both a hammer mill and a disc crusher).

The heat treatment conditions for carbonization of a raw carbonaceous material, which has preferably been pulverized, may be selected such that the raw material is pyrolyzed to permit all the elements other than carbon existing in the raw material to be removed nearly completely. In order to prevent carbon from being burnt out by oxidation, the heat treatment for carbonization is carried out in an inert atmosphere or in a vacuum. Carbonization takes place usually at a temperature in the range of 800 to 1500° C. and preferably in the vicinity of 1000° C. (900 to 1200° C.). The duration of heat treatment required for carbonization depends on the type and loading (amount) of the raw carbonaceous material and the temperature, and it is within the range of about 30 minutes to 3 hours when the heat treatment is performed at 1000° C.

The carbon material in powder obtained by pulverization and carbonization is then subjected to additional heat treatment for graphitization. This heat treatment is performed generally at a temperature of 2500° C. or above. The highest temperature is generally around 3200° C. in view of current industrially available heating techniques. Preferably, the heat treatment for graphitization is conducted at a temperature between 2700° C. and 3000° C. This heat treatment is continued for a period sufficient to complete the desired graphitization, which, although depending on the temperature, usually lasts from 20 minutes to 10 hours. The atmosphere for the heat treatment is a non-oxidizing atmosphere, preferably an inert gas atmosphere (e.g., nitrogen, helium, argon, neon, carbon dioxide, or the like) or a vacuum.

The resulting graphite powder formed by the heat treatment for graphitization has, in general, surface closed-end structures in which each c-plane layer of the graphite layer lattices is closed at its end on the surface of the powder. When the heat treatment is performed on a carbon material which has been pulverized at a high speed, the resulting graphite powder has slightly more than 100 open interstices per micrometer in the closed-end structures (except for the cases where a combination of a hammer mill and a disc crusher is used for pulverization, resulting in a significant increase in the number of open interstices). This is a graphite powder prepared by the first process according to the present invention. Despite the fact that the number of open interstices is slightly over 100 per micrometer, the graphite powder has a significantly improved discharge capacity compared to a graphite powder having less than 100 open interstices per micrometer.

In the second process, a graphite powder, which may be prepared as described above or by pulverizing natural graphite, is subjected to two types of heat treatment, oxidative heat treatment (or other heat treatment capable of removing the surface of the graphite) and subsequent heat treatment in an inert gas atmosphere, thereby significantly increasing the number of open interstices, as described below.

The oxidative heat treatment, to which a graphite powder is subjected initially, is intended to oxidatively remove the carbon existing on the surface of the graphite powder. As a result, the closed-end structures of c-plane layers formed on the surface of the powder by the heat treatment for graphitization are broken to form open-end structures. Thus, the graphite powder has open-end c-plane layers which generally coextend to form a relatively flat end face (see FIG. 6).

The conditions for the oxidative heat treatment are selected such that opening of the closed-end structures takes place substantially entirely by the action of oxidation. The temperature at which the heat treatment is performed is preferably in the range of 600–800° C. Due to good resistance to oxidation of the graphite powder to be treated which has closed-end structures, it may not be easily oxidized at a temperature below 600° C. On the other hand, at a temperature above 800° C., the graphite powder may be so rapidly oxidized that the entire graphite powder may possibly be deteriorated. The duration of the oxidative heat treatment depends on the temperature and the amount of the graphite powder, and it is generally in the range of 1 to 10 hours. The atmosphere for the oxidative heat treatment contains molecular oxygen and it may be either a pure oxygen gas or a mixed gas of oxygen and an inert gas (e.g., air).

As a result of the oxidative heat treatment which is accompanied by removal of the surface of the graphite powder, the graphite powder has a weight loss which is generally in the range of 2% to 5%. At the same time, the particle diameter of the graphite powder is slightly reduced (e.g., by about 1 to 2 $\mu$m). If necessary, the conditions for pulverizing are determined by allowing for the reduction of particle diameter caused by the oxidative heat treatment.

The means for opening the closed-end structures of a graphite powder is not limited to oxidative heat treatment. Any other means can be employed as long as it can remove the closed-end structures on the surface of the graphite and form generally coextending open-end c-plane layers. Examples of such other means include fluorinating heat treatment and hydrogenating heat treatment. The conditions for these heat treatments may be determined by experiment so as to ensure that the closed-end structures are opened.

Subsequently, the graphite powder is subjected to additional heat treatment performed in an inert gas atmosphere. The heat treatment in an inert gas atmosphere causes the open ends of pairs of c-plane layers to link, thereby again forming the closed-end structures of c-plane layers on the surface of the graphite powder.

Since the open-end c-plane layers formed by the oxidative heat treatment generally coextend to form a relatively flat end face of the layers, it is quite rare for two c-plane layers which are remote from each other to make a pair to be linked. Thus, it is unlikely occur that a large "unit closed-end structure" having a large number of linked pairs therein is formed, as shown in FIG. 2. Generally, the number of linked pairs in a unit closed-end structure will be at most five and mostly from one to three. Therefore, the closed-end structures will have a large number or high density of open interstices per unit length in a c-axis direction. As a result, the closed-end structures formed by the second process have open interstices at a low pitch, thereby making it possible to achieve an extremely high density of open interstices, e.g., in excess of 500 interstices per micrometer.

The inert gas atmosphere used in the subsequent heat treatment may be one or more of Ar, He, and Ne, for example. The temperature at which the heat treatment is performed may be selected so as to cause relatively large lattice vibrations sufficient to allow the end of each c-plane layer to link to the end of a neighboring c-plane layer. Since the closed-end structures formed by linking the ends of pairs of open-end c-plane layers are more stable and have a lower energy level, compared to the open-end structures, the occurrence of adequate lattice vibrations caused by heat treatment in an inert gas atmosphere permits the open ends of pairs of c-plane layers to link to each other. For this purpose, it is generally necessary to perform the heat treatment at a temperature of at least 800° C. There is no upper limit on the temperature which can be employed. The duration of the heat treatment is selected so as to form the desired closed-end structures, and it is generally in the range of 1 to 10 hours, although the duration largely depends on the temperature and loading. By way of example, the heat treatment can be carried out for approximately 5 hours at 1000° C.

During the oxidative heat treatment and the subsequent heat treatment in an inert gas, the specific surface area of the graphite powder varies significantly. Namely, the oxidative heat treatment greatly increases the surface area of the graphite powder due to an increased surface roughness by oxidation and opening of the closed-end structures. For example, the surface area of the graphite powder after the oxidative heat treatment may usually be three to ten times as large as that before this heat treatment. However, the reformation of the closed-end structures during the subsequent heat treatment in an inert gas is accompanied by a reduction of the surface area of the graphite powder. It was confirmed by the present inventors that the specific surface area of the graphite powder after the subsequent heat treatment is approximately at the same level as before the initial oxidative heat treatment. Thus, inasmuch as the specific surface area of the graphite powder formed by graphitization is substantially retained in the final product in the second process, the specific surface area of the product can be controlled primarily by the conditions for pulverization and heat treatment conditions for carbonization and graphitization even in the second process.

Unlike the first process, the density of open interstices in the closed-end structures of graphite can be greatly increased in the second process by the two types of heat treatment after graphitization. Therefore, the pulverization or comminution need not be performed at a high speed, and it can be conducted even after graphitization. Thus, a graphite powder obtained by pulverizing natural graphite can be used for heat treatment in the second process.

If necessary, the graphite powder prepared by the first or second process may be classified or screened to adjust the mean particle diameter. The time at which classification may be performed is not limited to the end of the process. It may be performed at any stage after pulverization, and may be repeated once or more.

The graphite powder according to the present invention may be used in same applications as a conventional graphite powder. Since it has closed-end structures of c-plane layers of graphite layer lattices with an increased number of open interstices (i.e., 100 to 1500 open interstices per micrometer) serving as primary entry sites for lithium ions, the graphite powder can exhibit an improved intercalation function and receive an increased amount of lithium ions therein.

Accordingly, the graphite powder according to the present invention is suitable for use as a material for negative electrodes of lithium ion secondary batteries, and it can provide the assembled lithium ion secondary batteries with improved discharge capacity over conventional ones due to the ability of the graphite powder to receive an increased amount of lithium ions. The closed-end structures of c-plane layers of the graphite powder allow the electrolyte solution to penetrate less easily into the graphite powder, thereby increasing the cycle life of the batteries upon repeated charging and discharging cycles. In a preferred embodiment where the graphite has a low specific surface area, the charge/discharge coulombic efficiency of the batteries is also improved.

The graphite powder according to the present invention can be used to produce a negative electrode in the same manner as employed in prior art lithium ion secondary batteries. In general, a graphite powder is applied to a metal base serving as a current collector with the aid of a suitable binder and is shaped thereon. Alternatively, a sintered electrode may be produced from the graphite powder without use of a binder. Thus, the negative electrode may be comprised predominantly or solely of the graphite powder, and a minor amount of a binder may be present in the electrode. The metal base may be any metal foil (e.g., copper foil including electrolytic copper foil and rolled copper foil) which can support the graphite powder well and which is not decomposed or dissolved under the operating conditions of the batteries.

The application of the graphite powder to a base metal or current collector and shaping thereof on the base metal can be conducted in the same manner as employed conventionally in the manufacture of electrodes from a powdery active material. Any technique which can shape the graphite powder well in a chemically and electrically stable manner can be employed. Examples of such techniques include the following: screen printing of the base with a paste which may be formed by mixing the graphite powder with a powder binder formed of a fluoroplastic such as a polytetrafluoroethylene or a polyvinylidene fluoride and a suitable organic solvent such as isopropyl alcohol; hot pressing of a dry mixture of the graphite powder with a powder binder made of a resin such as a polyethylene or polyvinyl alcohol on the base using a mold to shape the graphite powder and thermally attach the shaped body to the base simultaneously; and coating of the base with a slurry which may be formed by mixing the graphite powder with a powder binder made of a fluoroplastic as listed above or a water soluble binder such as carboxymethyl cellulose in a solvent such as N-methylpyrrolidone, dimethylformamide, water, or an alcohol, followed by drying the coated layer.

In assembling a lithium ion secondary battery, the graphite powder according to the present invention can be used in combination with a suitable active material for a positive electrode of such a battery and a nonaqueous electrolyte solution made by dissolving a lithium compound in an organic solvent.

An active materials which can be used for the positive electrode include the following: lithium-containing transition metal oxides having the formula $LiM^1_{1-x}M^2_xO_2$ or $LiM^1_{2y}M^2_yO_4$ (where x and y are numerical values meeting the inequalities: $0 \leq x \leq 4$ and $0 \leq y \leq 1$, and $M^1$ and $M^2$ each stand for a transition metal which is at least one member selected from Co, Ni, Mn, Cr, Ti, V, Fe, Zn, Al, In, and Sn); transition metal chalcogenides; vanadium oxides ($V_2O_5$, $V_6O_{13}$, $V_2O_4$, $V_3O_8$, and the like) and their lithium compounds (i.e., lithium vanadates); Chevrel's complex having the formula: $M_xMo_6S_{8-y}$ (where x and y are numerical values meeting the inequalities: $0 \leq x \leq 4$ and $0 \leq y \leq 4$, and M stands for a metal including transition metals); and activated carbon and activated carbon fibers.

Examples of the organic solvent used to form the non-aqueous electrolyte solution include, but are not limited to, propylene carbonate, ethylene carbonate, dimethyl carbonate, diethyl carbonate, 1,1- and 1,2-dimethoxyethane, 1,2-diethoxyethane, γ-butyrolactam, tetrahydrofuran, 1,3-dioxolane, 4-methyl-1,3-dioxolane, anisole, diethyl ether, sulfolane, methylsulfolane, acetonitrile, chloroacetonitrile, propionitrile, trimethyl borate, tetramethyl silicate, nitromethane, dimethylformamide, N-methylpyrrolidone, ethyl acetate, trimethyl orthoformate, and nitrobenzene. One or more of these solvents may be used.

The lithium compound used as an electrolyte may be an organic or inorganic lithium compound which is soluble in the organic solvent used. Examples of a suitable lithium compound include $LiClO_4$, $LiBF_4$, $LiPF_6$, $LiAsF_6$, $LiB(C_6H_5)$, LiCl, LiBr, $LiCF_3SO_3$, and $LiCH_3SO_3$. One or more of these lithium compounds may be used.

BEST MODE FOR CARRYING OUT THE INVENTION

The following examples are presented to further illustrate the present invention. These examples are to be considered in all respects as illustrative and not restrictive.

Example 1

This example illustrates the preparation of graphite powders having surface closed-end structures according to the present invention by the above-described first process.

A bulk mesophase material (10 kg) obtained by heat treatment of petroleum pitch was pulverized for 5 minutes by a hammer mill (a rotating impact pulverizer having six hammers, sold by Fuji Pawdar under the tradename U-Mizer) at different rotational speeds in the range of 5000 to 8000 rpm as shown in Table 1. The resulting bulk mesophase powder was carbonized by heating for 1 hour at 1000° C. in an argon atmosphere to give a carbon powder. The carbon powder was finally subjected to heat treatment for graphitization at 2800° C. for 30 minutes in an argon atmosphere to give a graphite powder.

The resulting graphite powder was screened to plus 5 μm and minus 45 μm and used to make electrodes. The size distribution of the screened graphite powder was measured using a laser diffraction/scattering size distribution analyzer (HORIBA LA-910). The mean particle diameter of the graphite powder was around 15 μm in each run.

Figure 5:
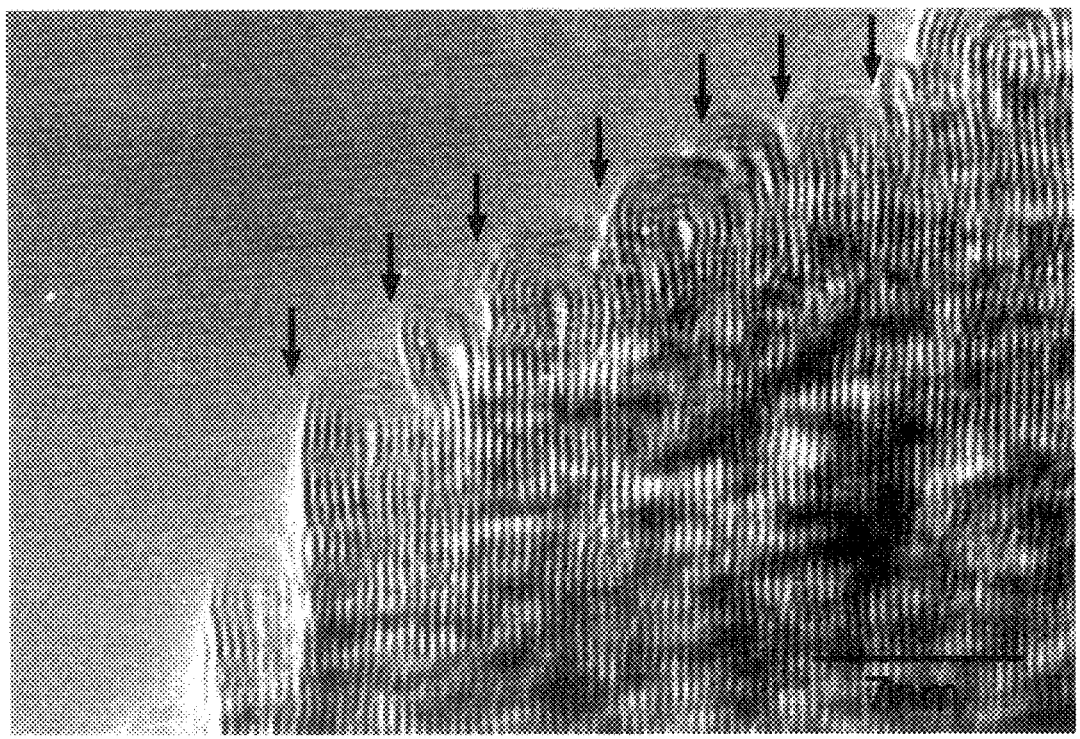
FIG. 5 is a high-resolution electron photomicrograph showing a region in cross section of a graphite powder adjacent to the surface thereof, wherein the graphite powder was prepared by a first process (in Example 1) and has surface closed-end structures and wherein the number of open interstices in the closed-end structures is slightly over 100 per micrometer measured in a c-axis direction.

FIG. 5 shows a high-resolution transmission electron photomicrograph of a cross section in an area near the surface of a graphite particle which was cut in a c-axis direction of the graphite layer lattice structure. The graphite particle was taken from the graphite powder which had been pulverized at a speed of 7500 rpm before carbonization. The electron photomicrograph clearly shows laminar closed-end structures of c-plane layers on the surface and open interstices (indicated by arrows) between adjacent unit laminar closed-end structures. Thus, the number (density) of open interstices (serving as entry sites for lithium ions) per micrometer in a c-axis direction could be determined from the photograph. Electron photomicrographs of 10 typical fields were taken for the graphite powder obtained in each run to determine their respective densities of open interstices, and the average of the ten values thus determined is shown in Table 1. As is seen from Table 1, the density of open interstices was at a level slightly larger than 100 open interstices per micrometer in each run, although it varied with the rotational speed of the pulverizer to some extent.

Table 1 also includes the measured values for specific surface area, crystallite size, and lattice spacing between c-planes (d002). The specific surface area was measured by a BET single point measuring method using an $N_2$ replacement technique. The crystallite size was determined by analyzing the (002) diffraction peak on a powder X-ray diffraction pattern measured using an X-ray diffractometer (manufactured by Mac Science) at an accelerating voltage of 40 kV and a current of 150 mA with a measuring range of 20° to 90°. The analysis was performed in accordance with the method known as the "Gakushin-ho" specified by the Japan Carbon Society. Although the maximum crystallite size of graphite prescribed in the Gakushin-ho method is 1000 Å, this method was applied to those samples having a crystallite size larger than 1000 Å to determine the crystallite size from the half-width of the peak. The value for d002 was determined from the X-ray diffraction pattern by a refined lattice constant measuring method in which even possible errors of the diffractometer used were treated by the least square method (no internal standard being used). All the peaks of the X-ray diffraction pattern appearing at the positions corresponding to the following indices of plane (Miller indices): (002), (100), (101), (004), (110), (112), and (006), were used. The X-ray diffraction measurements were carried out three times, and a weighted mean of the values for d002 determined by these measurements is shown in Table 1.

The graphite powder prepared in each run was used to produce electrodes in the following manner. Ninety (90) parts by weight of the graphite powder and 10 parts by weight of a polyvinylidene fluoride powder were mixed in N-methylpyrrolidone as a solvent to give a pasty material which is useful for the production of negative electrodes of lithium ion secondary batteries. The pasty material was applied with a doctor blade with a uniform thickness to a sheet of copper foil with a thickness of 20 μm serving as a current collector. After drying, the applied layer was compressed by cold pressing at 1 ton/cm² and further dried at 120° C. in vacuum. The resulting composite material was cut into one centimeter-square sections, which were used as negative electrodes to be tested.

The evaluation of the negative electrodes was made by a constant-current charging and discharging test in a cell having a negative electrode to be tested, and a counter electrode and a reference electrode both made of lithium. The nonaqueous electrolyte solution used in the cell was an 1M $LiClO_4$ solution dissolved in a mixed solvent of ethylene carbonate and dimethyl carbonate (1:1 volume ratio). The cell was tested by initially charging the cell to a voltage of 0.0 V vs the Li reference electrode with a current density of 0.3 mA/cm² to allow the negative electrode to receive lithium ions followed by discharging it to a voltage of 1.50 V vs the Li reference electrode with the same current density to release lithium ions to the solution. The charging and discharging cycles were repeated ten times with the discharge capacity being measured in each discharging cycle. The average of the values for discharge capacity measured from the second to tenth discharging cycles was shown in Table 1. The charge/discharge coulombic efficiency shown in Table 1 was the percentage of the quantity of electricity discharged in the first discharging cycle relative to that required to charge in the first charging cycle.

Example 2

This example illustrates the preparation of graphite powders having surface closed-end structures according to the present invention by the above-described second process.

A bulk mesophase material obtained by heat treatment of petroleum pitch was pulverized, carbonized and graphitized in the same manner as described in Example 1. The pulverization was performed at a rotational speed of 7500 rpm (the same speed employed for the production of the graphite powder shown in FIG. 5) using the same impact pulverizer. Since the graphite powder was prepared under exactly the same conditions as described in Example 1, the resulting graphite powder had the same closed-end structures of c-plane layers having the same density of open interstices as shown in FIG. 5.

The resulting graphite powder was subjected, without screening, to oxidative heat treatment for 3 hours at 700° C. in a pure oxygen atmosphere and then to additional heat treatment for 5 hours at 1000° C. in an argon atmosphere.

Figure 6:
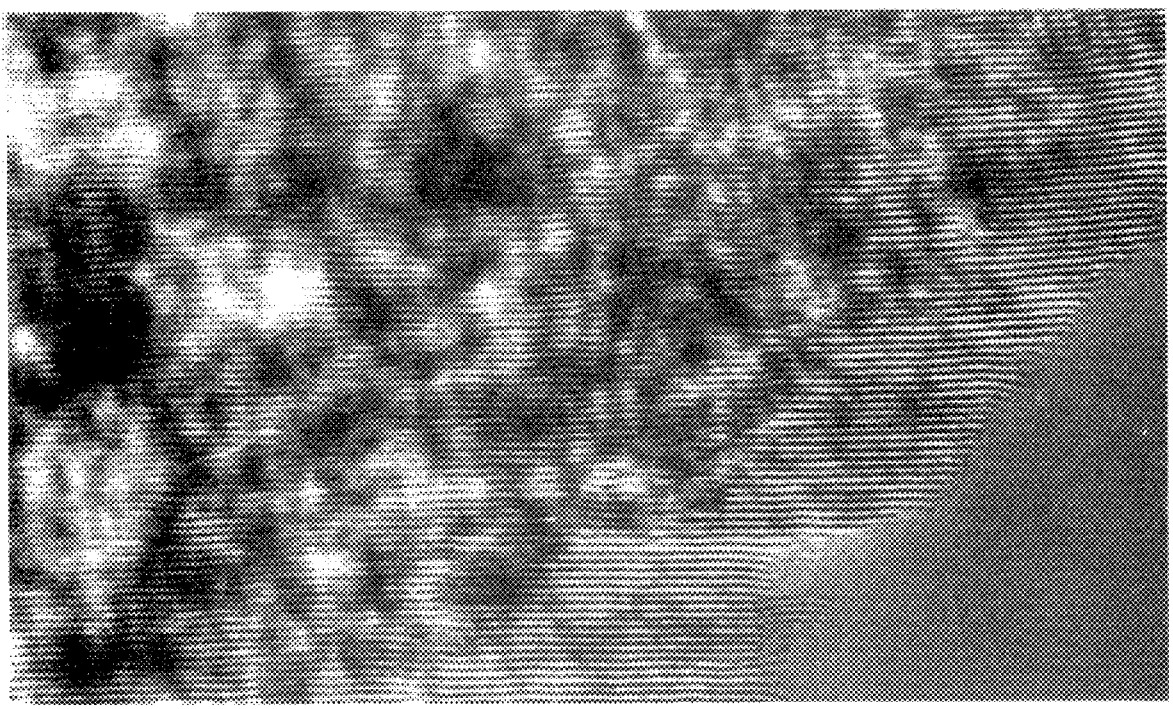
FIG. 6 is a high-resolution electron photomicrograph showing a region in cross section of a graphite powder near the surface which has been subjected to oxidative heat treatment and which has open-end structures of c-plane layers.

FIG. 6 shows a high-resolution electron photomicrograph of a region in cross section near the surface of the graphite powder after the oxidative heat treatment. It can be seen that the closed-end structures of c-plane layers observed with an asgraphitized graphite powder shown in FIG. 5 were broken substantially completely such that each of the c-planes, which roughly coextended, had an open end on the surface.

Figure 7:
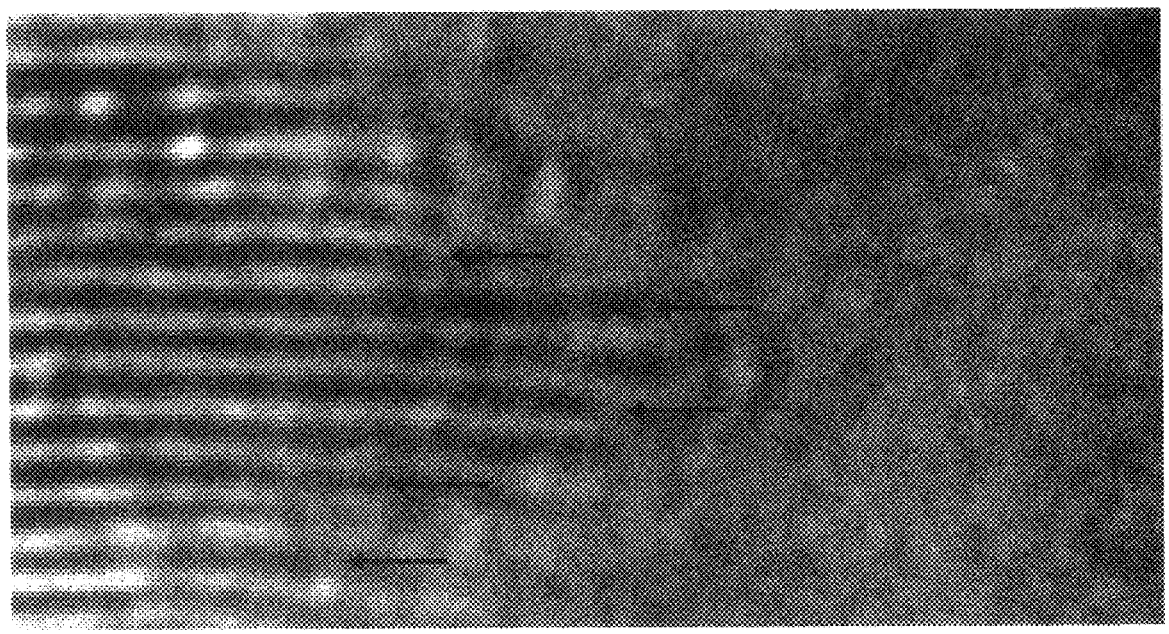
FIG. 7 is a high-resolution electron photomicrograph showing a region in cross section of a graphite powder adjacent to the surface thereof, wherein the graphite powder was prepared by a second process (in Example 2) and has surface closed-end structures and wherein the number of open interstices in the closed-end structures is 770 per micrometer measured in a c-axis direction.

FIG. 7 shows a high-resolution electron photomicrograph of a region in cross section near the surface of the graphite powder after the additional heat treatment in an argon atmosphere. It can be seen that the additional heat treatment caused the formation of surface closed-end structures from the open-end structures formed by the oxidative heat treatment. Compared to the surface closed-end structures of the asgraphitized powder shown in FIG. 5, the number of c-plane layers forming a unit laminar closed-end structure was much smaller, in other words, the number of open interstices (indicated by arrows) in the closed-end structures per unit length was greatly increased. The closed-end structures shown in FIG. 7 had 770 open interstices per micrometer. In view of the fact that the theoretical maximum density of open interstices (that is obtained in such cases where all the unit closed-end structures have a single layer closed-end formed by linkage of two adjacent c-plane layers as shown in FIG. 4) is about 1500 open interstices per micrometer, the number of open interstices of the graphite powder shown in FIG. 7 is about a half of the maximum value, indicating that the graphite had unit open-end structures constituted, on the average, by about four c-plane layers forming a two-layered closed-end structure.

After the heat-treated graphite powder was screened to plus 5 μm and minus 45 μm, it was used to make electrodes for testing in the same manner as described in Example 1. The discharge capacity and charge/discharge coulombic efficiency obtained with the graphite powder and the crystallographic and other data on the powder are shown in Table 1.

Although the graphite powder obtained in this example had 770 open interstices per micrometer in the closed-end structures, the number of open interstices can be decreased by employing a lower speed for pulverization and/or more severe conditions for the additional heat treatment of graphite in an argon atmosphere (e.g., a higher temperature). Conversely, the number of open interstices can be increased by employing more mild conditions for the additional heat treatment of graphite in an argon atmosphere (e.g., a lower temperature), whereby it is less likely that two c-planes which are far away from each other will make a pair for linkage.

Comparative Example 1

A graphite powder was prepared by pulverizing a bulk mesophase material followed by carbonization and graphitization by heat treatment in the same manner as described in Example 1 except that the pulverization of the mesophase material was performed on the impact pulverizer at a rotational speed of 4500 rpm. A high-resolution transmission electron photomicrograph of the resulting graphite powder in cross section in a c-axis direction is shown in FIG. 3. As can be seen from this photograph, although closed-end structures were formed in the graphite powder, each closed-end structure was as large as 10 nm or larger and had a greater number of c-plane layers constituting a unit laminar closed-end structure. As a result, the number of open interstices (indicated by arrows) was as small as 80 per micrometer.

The other properties of the graphite powder including crystallographic properties as well as the discharge capacity and the charge/discharge coulombic efficiency as a negative electrode in a test cell assembled in the same manner as described in Example 1 are shown in Table 1.

As can be seen from Table 1, those graphite powders having 100 or more open interstices (which act as entry sites for lithium ions) per micrometer in the surface closed-end structures of graphite layer lattices according to the present invention could give a high discharge capacity in excess of 320 mAh/g when used in lithium ion secondary batteries. As illustrated in Example 2, the graphite powder prepared by the second process, in which the surface closed-end structures of the graphite were opened and then closed again by heat treatment, had a significantly increased number (or decreased pitch) of open interstices in the closed-end structures. The increased number of open interstices was accompanied by an increase in discharge capacity.

Example 3

Using a bulk mesophase material obtained by heat treatment of coal tar pitch, a graphite powder was prepared in the same manner as described in Example 1 except that pulverization was performed at a fixed rotational speed of 7500 rpm for different periods. The number of open interstices per micrometer and specific surface area of the resulting graphite powder (screened to plus 5 μm and minus 63 μm) are shown in Table 2 along with the conditions for pulverization. The results of discharge capacity and charge/discharge coulombic efficiency measured in the same manner as described in Example 1 are shown in Table 2.

Example 4

Using a bulk mesophase material obtained by heat treatment of coal tar pitch, a graphite powder was prepared in the same manner as described in Example 2 except that the duration of pulverization was varied. The number of open interstices per micrometer and specific surface area of the resulting graphite powder (screened to plus 5 μm and minus 63 μm) are shown in Table 2 along with the conditions for pulverization and the results of discharge capacity and charge/discharge coulombic efficiency.

Comparative Example 2

Using a bulk mesophase material obtained by heat treatment of coal tar pitch, a graphite powder was prepared in the same manner as described in Comparative Example 1 except that the duration of pulverization was varied. The number of open interstices per micrometer and specific surface area of the resulting graphite powder (screened to plus 5 μm and minus 63 μm) are shown in Table 2 along with the conditions for pulverization and the results of discharge capacity and charge/discharge coulombic efficiency.

TABLE 1

| Ex. No. | Process | Hammer mill speed (rpm) | Number of open interstices per μm | Specific surface area (m$^2$/g) | Crystallite size (Å) | d 002 (Å) | Mean particle diameter (μm) | Discharge capacity (mAh/g) | Charge/discharge coulombic efficiency (%) |
|---|---|---|---|---|---|---|---|---|---|
| Ex. 1 | 1st | 5000 | 104 | 0.55 | 238 | 3.364 | 15.4 | 322 | 97 |
| | | 6000 | 107 | 0.53 | 250 | 3.364 | 15.3 | 328 | 95 |
| | | 7000 | 106 | 0.61 | 257 | 3.364 | 14.8 | 328 | 96 |
| | | 7500 | 103 | 0.57 | 237 | 3.364 | 15.2 | 324 | 95 |
| | | 8000 | 110 | 0.58 | 270 | 3.364 | 15.1 | 337 | 97 |
| Ex. 2 | 2nd | 7500 | 770 | 0.59 | 292 | 3.364 | 15.3 | 350 | 96 |
| Co. 1 | 1st | 4500 | 80 | 0.57 | 247 | 3.365 | 15.4 | 290 | 95 |

Ex. = Example; Co. = Comparative Example. Pulverized for 5 minutes.

TABLE 2

| Example No. | Process | Hammer mill speed (rpm) | Pulverization period (min) | Number of open interstices per μm | Specific surface area (m²/g) | Discharge capacity (mAh/g) | Charge/discharge coulombic efficiency (%) |
|---|---|---|---|---|---|---|---|
| Example 3 | 1st | 7500 | 5 | 104 | 0.55 | 322 | 97 |
| | | | 15 | 103 | 0.60 | 329 | 97 |
| | | | 30 | 104 | 1.00 | 322 | 91 |
| | | | 45 | 105 | 1.50 | 328 | 86 |
| | | | 60 | 107 | 3.00 | 336 | 84 |
| Example 4 | 2nd | 7500 | 5 | 770 | 0.59 | 350 | 97 |
| | | | 30 | 770 | 1.00 | 350 | 90 |
| Comparative Example 2 | 1st | 4500 | 5 | 80 | 0.57 | 290 | 95 |
| | | | 45 | 80 | 1.00 | 290 | 89 |
| | | | 100 | 80 | 3.00 | 295 | 83 |

Crystallite size was 232–264Å, d002 was 3.364–3.365Å, and mean particle diameter was around 15 μm in all runs.

As can be seen from Table 2, as the pulverization is performed for a longer period, the resulting graphite powder has an increased specific surface area. However, the specific surface area of the graphite powder did not have a substantial effect on the number of open interstices in the graphite. As is the case with Table 1, those graphite powders having 100 or more open interstices per micrometer in the surface closed-end structures could give a high discharge capacity in excess of 320 mAh/g. On the other hand, the charge/discharge coulombic efficiency was influenced by the specific surface area of the graphite. Thus, those graphite powders having a specific surface area of 1.0 m²/g or less gave a high charge/discharge coulombic efficiency of 90% or higher, while the charge/discharge coulombic efficiency was decreased with an increase in the specific surface area to greater than 1.0 m²/g. Comparing Examples 3 and 4, it can be seen that the specific surface area of a graphite powder having surface closed-end structures did not change significantly between before and after subjecting a graphite powder to oxidative heat treatment and additional heat treatment in an inert atmosphere to increase the number (density) of open interstices in those structures.

Example 5

This example illustrates the preparation of graphite powders having surface closed-end structures according to the present invention by the first process.

A bulk mesophase pitch derived from coal tar pitch was carbonized by heating at 1000° C. in an argon atmosphere, and the resulting carbon material was pulverized so as to form a carbon powder, about 90% by volume of which had a particle diameter in the range of 1 to 80 μm. The pulverization was performed using a hammer mill followed by a disc crusher. The hammer mill was the same as used in Example 1 and was operated at a rotational speed in the range of 6000 to 8000 rpm. The disc crusher was operated at a rotational speed in the range of 50 to 200 rpm. The pulverization was continued for 5 minutes in each pulverizer.

The carbon powder obtained by pulverization with the hammer mill and disc crusher was then graphitized by heat treatment in the same manner as described in Example 1 to give a graphite powder.

The properties of the graphite powder including the number of open interstices in the closed-end structures, specific surface area, crystallite size, mean particle diameter, discharge capacity, and charge/discharge coulombic efficiency are shown in Table 3 along with the rotational speeds of the two types of pulverizers used.

Example 6

This example illustrates the preparation of graphite powders having surface closed-end structures according to the present invention by the second process.

A bulk mesophase pitch derived from coal tar pitch was carbonized by heating at 1000° C. in an argon atmosphere, and the resulting carbon material was pulverized so as to form a carbon powder, about 90% by volume of which had a particle diameter in the range of 1 to 80 μm. The pulverization was performed using a disc crusher alone, which was operated at a rotational speed in the range of 50 to 200 rpm.

The carbon powder obtained by pulverization with the disc crusher was then subjected to heat treatment for graphitization, oxidative heat treatment, and finally heat treatment in an argon atmosphere in the same manner as described in Example 2 to give a graphite powder. The properties of the resulting graphite powder including the number of open interstices in the closed-end structures, specific surface area, crystallite size, mean particle diameter, discharge capacity, and charge/discharge coulombic efficiency are shown in Table 3 along with the rotational speed of the pulverizer used.

TABLE 3

| Ex. No. | Process | Pulverizer speed (rpm) Hammer mill | Disc | Number of open interstices per μm | Specific surface area (m²/g) | Crystallite size (Å) | Mean particle diameter (μm) | Discharge capacity (mAh/g) | Charge/discharge coulombic efficiency (%) |
|---|---|---|---|---|---|---|---|---|---|
| Ex. 5 | 1st | 6000 | 50 | 105 | 0.97 | 1950 | 22.7 | 335 | 92 |
|  |  | 6000 | 200 | 108 | 0.89 | 202 | 21 | 321 | 91 |
|  |  | 6000 | 150 | 102 | 0.88 | 1230 | 21.1 | 332 | 91 |
|  |  | 6700 | 150 | 900 | 0.91 | 1150 | 20.7 | 351 | 92 |
|  |  | 7400 | 150 | 1320 | 0.92 | 980 | 18.9 | 351 | 93 |
|  |  | 8000 | 150 | 1460 | 0.94 | 1200 | 18.7 | 354 | 95 |
| Ex. 6 | 2nd | — | 50 | 760 | 0.87 | 1770 | 19.4 | 330 | 94 |
|  |  | — | 150 | 940 | 0.92 | 1230 | 18.7 | 324 | 92 |
|  |  | — | 200 | 1200 | 0.96 | 240 | 16.5 | 315 | 93 |

Pulverized for 5 minutes; d002 was in the range of 3.363–3.365Å in all runs.

The graphite powders obtained by the first process in which a combination of a hammer mill and a disc crusher was used for pulverization had 100 or more open interstices per micrometer in the closed-end structures and a crystallite size in the range of 100 to 2000 Å. It is noted that the number of open interstices could be controlled by the rotational speed of the hammer mill, while the crystallite size, by the rotational speed of the disc crusher. By increasing the rotational speed of the hammer mill, it became possible to prepare a graphite powder in which the number of open interstices was very large and close to the theoretical maximum, 1500 interstices per micrometer, by the first process.

By the second process, in spite of the use of the disc crusher alone at 50–200 rpm for pulverization, it was possible to prepare a graphite powder having a high density of open interstices and exhibiting discharge properties comparable to those graphite powders prepared in Examples 2 and 4.

Example 7

A graphite powder was prepared in the same manner as described in Example 1 except that the rotational speed of the pulverizer was fixed at 7500 rpm (with a pulverizing period of 5 minutes) while the heat treatment for graphitization was performed at different temperatures for 30 minutes. The number of open interstices in the surface closed-end structures of the resulting graphite powder is shown in Table 4 along with various other properties of the powder and the discharge capacity and charge/discharge coulombic efficiency.

Example 8

A graphite powder was prepared in the same manner as described in Example 2 except that the rotational speed of the pulverizer was fixed at 4500 rpm (with a pulverizing period of 5 minutes) while the heat treatment for graphitization was performed at different temperatures and the conditions for the oxidative heat treatment were changed to 650° C. ×2 hours. The subsequent heat treatment in an argon atmosphere was performed under the same conditions as in Example 2 (1000° C. ×5 hours). The number of open interstices in the surface closed-end structures of the resulting graphite powder is shown in Table 4 along with various other properties of the powder and the discharge capacity and charge/discharge coulombic efficiency.

TABLE 4

| Ex. No. | Process | Hammer mill speed (rpm) | Graphitization temp. (° C.) | Number of open interstices per μm | Specific surface area (m²/g) | d 002 (Å) | Discharge capacity (mAh/g) | Charge/discharge coulombic efficiency (%) |
|---|---|---|---|---|---|---|---|---|
| Ex. 7 | 1st | 7500 | 2800 | 103 | 0.57 | 3.3650 | 324 | 95 |
|  |  | 7500 | 2900 | 103 | 0.58 | 3.3632 | 331 | 95 |
|  |  | 7500 | 3000 | 103 | 0.66 | 3.3614 | 336 | 94 |
| Ex. 8 | 2nd | 4500 | 2800 | 500 | 0.76 | 3.3666 | 336 | 95 |
|  |  | 4500 | 2900 | 500 | 0.77 | 3.3643 | 345 | 95 |
|  |  | 4500 | 3000 | 500 | 0.71 | 3.3612 | 358 | 95 |

Pulverized for 5 minutes; crystallite size was 210–237Å and mean particle diameter was about 21–23 μm in all runs.

As can be seen from Table 4, as the temperature at which graphitization occurred increased, the resulting graphite had a smaller value for d002, indicating that the crystallinity of the graphite powder was improved. The improved crystallinity was accompanied by an improved discharge capacity, although it had no substantial effect on the charge/discharge coulombic efficiency.

Example 9

A graphite powder was prepared in the same manner as described in Example 1. The pulverization of the raw material was performed at 7500 rpm (for 5 minutes). After the heat treatment for graphitization, the resulting graphite powder was classified by screening to obtain several fractions having different mean particle diameters. The number of open interstices per micrometer in the surface closed-end structure of each fraction is shown in Table 5 along with other various properties thereof and the discharge capacity and charge/discharge coulombic efficiency.

In addition, each fraction of the graphite powder was evaluated with respect to packaging density and stability on an electrode plate in the following manner. The results of these evaluations are also shown in Table 5.

Packing Density

The packing density of a powder is an index as to how densely the powder can be packed in a given volume, which influences the energy density per unit volume of an electrode. For this reason, the packing density of each fraction of the graphite powder was measured in accordance with the tap density measuring method specified in JIS z2500. The tapping was performed ten times. The results were evaluated as follows:

◯: packing density of 1.17 g/cc or higher,

×: packing density of less than 1.17 g/cc.

Stability on Electrode Plate

As described previously, if coarse particles exist on an electrode plate, they may penetrate through the adjacent thin separator sheet to cause internal shorts. Therefore, the size distribution of each fraction measured by the laser diffraction/scattering size distribution analyzer was checked to determine the volume percent of coarse particles having a size greater than 200 $\mu$m. The stability on an electrode plate was evaluated to be poor (×) if the fraction contained 0.5% by volume or more of coarse particles, and to be good (◯) if it contained less. Such coarse particles often have irregular shapes having a big difference between their longer and shorter diameters, and it is difficult to remove these particles by screening if their shorter diameters are smaller than the opening size of the screen used.

Example 10

A graphite powder was prepared in exactly the same manner as described in Example 2. The resulting graphite powder was classified by screening to obtain several fractions having different mean particle diameters. The number of open interstices per micrometer in the surface closed-end structure of each fraction is shown in Table 5 along with other various properties thereof, the discharge capacity and charge/discharge coulombic efficiency, packing density, and stability on an electrode plate.

A decrease in the mean particle diameter of the graphite powder, particularly to less than 5 $\mu$m, caused a deterioration in charge/discharge coulombic efficiency of the electrode and a decrease in packing density. When the mean particle diameter of the graphite was larger than 35 $\mu$m, the stability on an electrode plate was deteriorated.

Example 11

Figure 8:
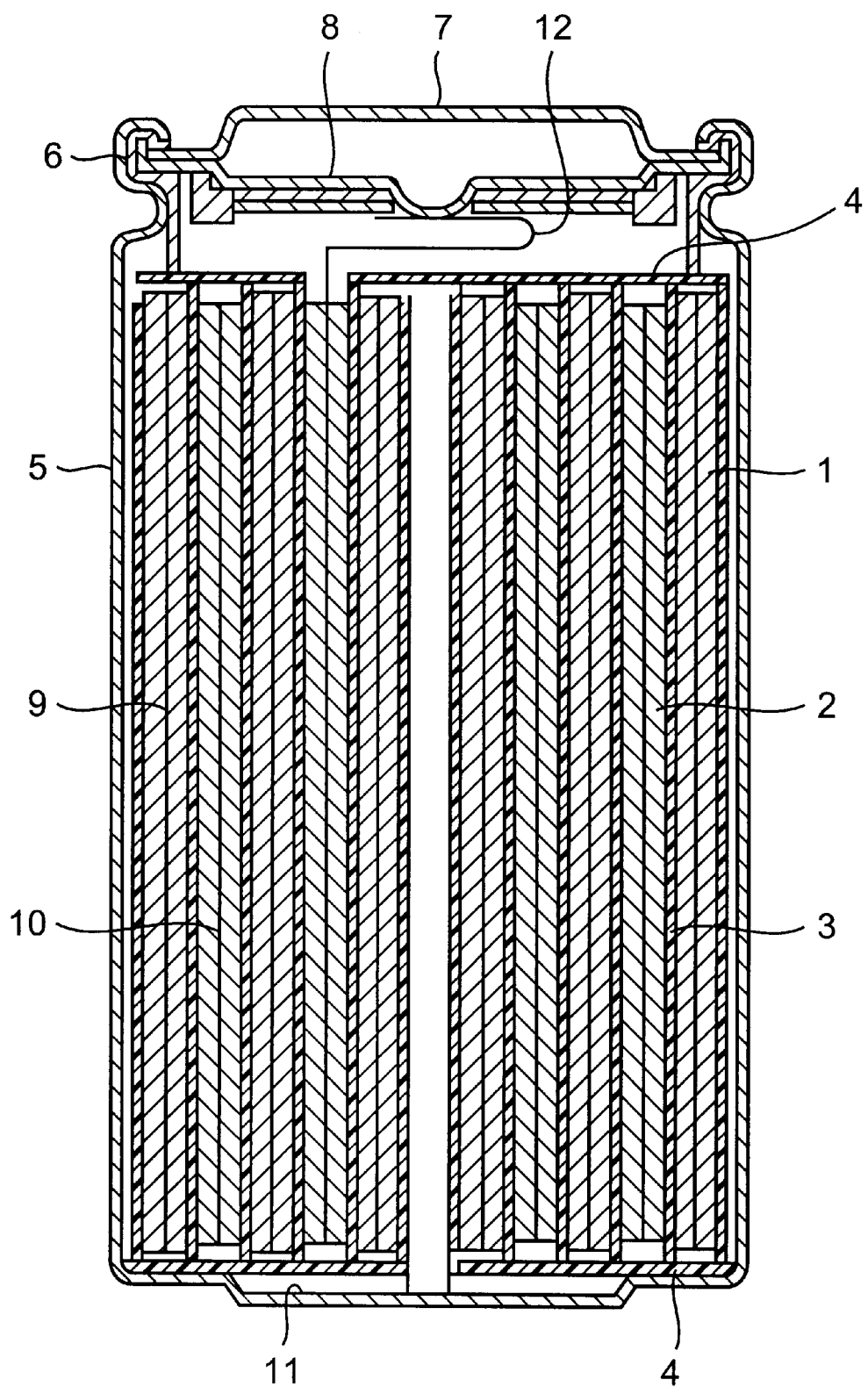
FIG. 8 is a schematic cross-sectional view showing the structure of a lithium ion secondary battery assembled in an example.

This example illustrates the assembly of cylindrical lithium ion secondary batteries having the structure shown in FIG. 8 using the graphite powders obtained in the preceding Examples 1 to 10 and Comparative Examples 1 to 2.

A negative electrode 1 was produced from a material prepared by combining 90 parts by weight of one of the graphite powders with 10 parts by weight of a polyvinylidene fluoride (PVDF) serving as a binder. The material for the negative electrode was dispersed in N-methylpyrrolidone to prepare a slurry having a pasty consistency, which was applied to both surfaces of a strip of copper foil having a thickness of 10 $\mu$m and serving as a current collector 9 for the negative electrode. After drying, the applied graphite layer was finally compressed in a mold to produce the negative electrode 1.

A positive electrode 2 was produced from $LiCoO_2$ which had been prepared by calcining a mixture of lithium carbonate and cobalt carbonate at a molar ratio of 0.5:1 at 900° C. for 5 hours in air. The resulting $LiCoO_2$ had an X-ray diffraction pattern in which the peak for $LiCoO_2$ was well coincident with that registered on the JCPDS files. The $LiCoO_2$ was pulverized and screened to give a $LiCoO_2$ powder having a 50% cumulative mean particle diameter of 15 $\mu$m. Ninety five (95) parts by weight of the $LiCoO_2$ powder were mixed with 5 parts by weight of lithium carbonate, and 91 parts by weight of the resulting mixture was combined with 6 parts by weight of a graphite powder serving as an electrical conductor and 3 parts by weight of PVDF as a binder to prepare a material for the positive electrode. This material was dispersed in N-methylpyrrolidone to prepare a slurry having a pasty consistency, which was applied to both surfaces of a strip of aluminum foil having a thickness of 20 $\mu$m and serving as a current collector 10 for the positive electrode. After drying, the applied layer was finally compressed in a mold to produce the positive electrode 2.

Thereafter, as shown in FIG. 8, the negative electrode 1 and positive electrode 2 both in strip form were rolled to form a large number of turns along with two strips of a

TABLE 5

| Ex. No. | Process | Hammer mill speed (rpm) | Number of open interstices per $\mu$m | Specific surface area (m²/g) | Mean particle diameter ($\mu$m) | Discharge capacity (mAh/g) | Charge/discharge coulombic efficiency (%) | Packing density | Stability on electrode plate |
|---|---|---|---|---|---|---|---|---|---|
| Ex. 9 | 1st | 7500 | 104 | 1.69 | 4.1 | 319 | 90 | X | ◯ |
|  |  | 7500 | 103 | 0.64 | 5.4 | 326 | 91 | ◯ | ◯ |
|  |  | 7500 | 104 | 0.54 | 32.1 | 358 | 95 | ◯ | ◯ |
|  |  | 7500 | 102 | 0.51 | 37.4 | 331 | 96 | ◯ | X |
| Ex. 10 | 2nd | 7500 | 768 | 1.64 | 4.2 | 325 | 90 | X | ◯ |
|  |  | 7500 | 772 | 0.72 | 20.1 | 331 | 97 | ◯ | ◯ |
|  |  | 7500 | 750 | 0.57 | 34.7 | 333 | 96 | ◯ | ◯ |
|  |  | 7500 | 770 | 0.55 | 38.3 | 335 | 96 | ◯ | X |

Pulverized for 5 minutes; crystallite size was 245–276Å and d002 was 3.364–3.365Å in all runs.

separator 3 made of a microporous polypropylene film of 25 μm thickness after they were stacked in the order of negative electrode 1, separator 3, positive electrode 2, and separator 3. An electrode assembly in the form of a roll having an outer diameter of 18 mm was prepared in this manner, and it was inserted into a cylindrical battery container 5 made of a nickel-plated steel. An insulator plate 4 was placed on each end of the roll of the electrode assembly. An aluminum lead 12 for the positive electrode connected to the positive electrode current collector 10 was welded to a battery lid 7, and a nickel lead 11 for the negative electrode connected to the negative electrode current collector 9 was welded to a battery container 5.

A 1M $LiPF_6$ solution dissolved in a mixed solvent of ethylene carbonate and diethyl carbonate at a volume ratio of 1:1 was poured as an electrolyte solution into the battery container which had received the roll of the electrode assembly. Thereafter, a safety valve element 8 equipped with a current-interrupting mechanism and the battery lid 7 were secured to the battery container 5 by caulking through an insulating sealing gasket 6 coated with asphalt on its surface to finish the assembly of a cylindrical nonaqueous secondary battery having a diameter of 18 mm and a height of 65 mm.

Fifty batteries were made for each graphite powder in the above described manner and their performance was evaluated as follows.

Evaluation of Batteries

1) Charging: Charged for 2.5 hours by a current of 1 A with a maximum charging voltage of 4.2 V.

2) Discharging: Discharged with a constant current of 700 mA until the battery voltage dropped to 2.75 V.

3) Discharge Capacity: Calculated from the time required for discharging to 2.75 V with a 700 mA current.

4) Battery Capacity: The battery capacity was the highest discharge capacity obtained between the second and fifth cycles. The average value for the 50 batteries was recorded.

5) Cycle Performance: The percent retention of discharge capacity upon 200 repeated charging and discharging cycles, which was determined from the discharge capacity obtained in the last (200th) cycle divided by the highest discharge capacity obtained during the cycles, was used as an index for evaluation.

The results are shown in Table 6.

TABLE 6

| Ex. No. | Process | Conditions or properties | Number of open interstices per μm | Discharge capacity (mAh/g) | Charge/discharge coulombic efficiency (%) | Battery capacity (mAh) | Cycle performance (%) |
|---|---|---|---|---|---|---|---|
| Ex. 1 | 1st | 5000 rpm | 104 | 322 | 97 | 1601 | 83 |
| | | 6000 rpm | 107 | 328 | 95 | 1585 | 85 |
| | | 7000 rpm | 106 | 328 | 96 | 1593 | 85 |
| | | 7500 rpm | 103 | 324 | 95 | 1585 | 84 |
| | | 8000 rpm | 110 | 337 | 97 | 1601 | 87 |
| Ex. 2 | 2nd | 7500 rpm | 770 | 350 | 96 | 1593 | 91 |
| Co. 1 | 1st | 4500 rpm | 80 | 290 | 95 | 1498 | 68 |
| Ex. 3 | 1st | 5 min | 104 | 322 | 97 | 1601 | 83 |
| | | 15 min | 103 | 329 | 97 | 1601 | 85 |
| | | 30 min | 104 | 322 | 91 | 1553 | 83 |
| | | 45 min | 105 | 328 | 86 | 1514 | 85 |
| | | 60 min | 107 | 336 | 84 | 1498 | 87 |
| Ex. 4 | 2nd | 5 min | 770 | 350 | 97 | 1601 | 91 |
| | | 30 min | 770 | 350 | 90 | 1545 | 91 |
| Co. 2 | 1st | 5 min | 80 | 290 | 95 | 1498 | 68 |
| | | 45 min | 80 | 290 | 89 | 1495 | 60 |
| | | 100 min | 80 | 295 | 83 | 1490 | 72 |
| Ex. 5 | 1st | 6000/50 rpm | 105 | 335 | 92 | 1561 | 87 |
| | | 6000/200 rpm | 108 | 321 | 91 | 1553 | 83 |
| | | 6000/150 rpm | 102 | 332 | 91 | 1553 | 86 |
| | | 6700/150 rpm | 900 | 351 | 92 | 1561 | 91 |
| | | 7400/150 rpm | 1320 | 351 | 93 | 1569 | 91 |
| | | 8000/150 rpm | 1460 | 354 | 95 | 1585 | 92 |
| Ex. 6 | 2nd | —/50 rpm | 760 | 330 | 94 | 1577 | 85 |
| | | —/150 rpm | 940 | 324 | 92 | 1561 | 84 |
| | | —/200 rpm | 1200 | 315 | 93 | 1569 | 81 |
| Ex. 7 | 1st | 2800° C. | 103 | 324 | 95 | 1585 | 84 |
| | | 2900° C. | 103 | 331 | 95 | 1585 | 86 |
| | | 3000° C. | 103 | 336 | 94 | 1577 | 87 |
| Ex. 8 | 2nd | 2800° C. | 500 | 336 | 95 | 1585 | 87 |
| | | 2900° C. | 500 | 345 | 95 | 1585 | 89 |
| | | 3000° C. | 500 | 358 | 95 | 1585 | 93 |
| Ex. 9 | 1st | 4.1 μm | 104 | 319 | 90 | 1545 | 83 |
| | | 5.4 μm | 103 | 326 | 91 | 1553 | 84 |
| | | 32.1 μm | 104 | 358 | 95 | 1585 | 93 |
| | | 37.4 μm | 102 | 331 | 96 | 1593 | 86 |
| Ex. 10 | 2nd | 4.2 μm | 768 | 325 | 90 | 1545 | 84 |
| | | 20.1 μm | 772 | 331 | 97 | 1601 | 86 |
| | | 34.7 μm | 750 | 333 | 96 | 1593 | 86 |
| | | 38.3 μm | 770 | 335 | 96 | 1593 | 87 |

Ex. = Example; Co. = Comparative Example.

The lithium ion secondary batteries assembled with a negative electrode formed from a graphite powder having 100 or more open interstices in the surface closed-end structures according to the present invention exhibited a high battery capacity due to the high discharge capacity and charge/discharge coulombic efficiency and good packing (high packing density) of the graphite powder. In addition, they had good cycle performance due to the closed-end structures of c-plane layers of the graphite powder having no open end, which could prevent undesirable reactions such as gas evolutions by decomposition of the electrolyte solution. Thus, it was confirmed that all the batteries in the Examples in which a graphite powder according to the present invention was used could retain at least 80% of the highest capacity in the last cycle of the repeated 200 cycle charging and discharging test.

In contrast, in Comparative Examples in which a graphite powder having less than 100 open interstices in the closed-end structures was used, the battery capacity and cycle performance were both significantly deteriorated.

INDUSTRIAL APPLICABILITY

In accordance with the present invention, a graphite powder having surface closed-end structures of graphite c-plane layers can be prepared in which the closed-end structures have an increased number of open interstices serving as primary entry sites for lithium ions. The use of the graphite powder as a material for negative electrodes of lithium ion secondary batteries makes it possible to assemble a lithium ion secondary batteries having a good cycle life and a high discharge capacity exceeding 320 mAh/g and, if the graphite powder has a well-controlled specific surface area, a high charge/discharge coulombic efficiency. Accordingly, the present invention will contribute to improvement in performance of lithium ion secondary batteries.

What is claimed is:

1. A graphite powder characterized by having closed-end structures in which the graphite c-plane layers are connected so as to form interstices which are open on the surface of the graphite, the number of the open interstices being at least 100 and at most 1500 per micrometer measured in a c-axis direction of the graphite, and the graphite powder having a specific surface area of 1.0 m$^2$/g or less.

2. The graphite powder according to claim 1 wherein the graphite powder has the following properties:
   the (002) plane-lattice spacing in a c-axis direction (d002) is 3.3700 Å or less as determined by a refined lattice constant measuring method using X-ray diffractometry;
   the graphite crystallite size in a c-axis direction is in the range of 100 to 2000 Å; and
   the volume cumulative mean particle diameter is in the range of 5 to 35 μm as determined by a laser diffraction/scattering method.

3. A material for negative electrodes of lithium ion secondary batteries, comprising predominantly the graphite powder according to claim 1.

4. A lithium ion secondary battery having a negative electrode produced from the material according to claim 3.

5. A process for preparing the graphite powder according to claim 1, comprising subjecting a carbon material to carbonization, pulverizing the carbon material before and/or after the carbonization, followed by heat treating the carbon material at a temperature of 2500° C. or higher for graphitization.

6. A process for preparing the graphite powder according to claim 1, comprising subjecting a graphite powder to heat treatment under conditions effective to remove the surface of the graphite and subsequently heat treating the graphite powder at a temperature of 800° C. or higher in an inert gas.

7. The process according to claim 4 wherein the heat treating step is carried out under oxidative conditions that removes the surface of the graphite.

8. The process according to claim 4 wherein the graphite powder is prepared by subjecting a carbon material to carbonization followed by heat treating the graphite powder at a temperature of 2500° C. or higher for graphitization and performing pulverization before or after the carbonization or after the graphitization.

9. A process for preparing the graphite powder according to claim 2, comprising subjecting a carbon material to carbonization, pulverizing the carbon material before and/or after the carbonization, followed by heat treating the carbon material at a temperature of 2500° C. or higher for graphitization.

10. A process for preparing the graphite powder according to claim 2, comprising subjecting a graphite powder to heat treatment under conditions effective to remove the surface of the graphite and subsequently heat treating the graphite powder at a temperature of 800° C. or higher in an inert gas.

11. The process according to claim 7 wherein the graphite powder is prepared by subjecting a carbon material to carbonization followed by heat treating the graphite at a temperature of 2500° C. or higher for graphitization and performing pulverization before or after the carbonization or after the graphitization.

12. A process for preparing the graphite powder according to claim 1, wherein a graphite powder is subjected initially to oxidative heat treatment during which closed-end structures of c-planes having a first density of open interstices is destroyed and a subsequent heat treatment in an inert gas during which closed-end structures of c-planes with a second density of open interstices higher than the first density of open interstices are formed on the surface of the graphite powder.

13. The process according to claim 7 wherein the graphite powder is prepared pulverizing a naturally-occurring graphite.

14. A material for negative electrodes of lithium ion secondary batteries, comprising predominantly the graphite powder according to claim 2.

15. The process according to claim 6 wherein the graphite powder is prepared by pulverizing a naturally-occurring graphite.

* * * * *